(12) United States Patent
Seki et al.

(10) Patent No.: US 8,566,316 B2
(45) Date of Patent: Oct. 22, 2013

(54) INFORMATION PROCESSING APPARATUS AND METHOD, PROGRAM, AND INFORMATION PROCESSING SYSTEM

(75) Inventors: Naoko Seki, Kanagawa (JP); Tsuyoshi Kawabe, Tokyo (JP)

(73) Assignee: Sony Corporation, Tokyo (JP)

( * ) Notice: Subject to any disclaimer, the term of this patent is extended or adjusted under 35 U.S.C. 154(b) by 66 days.

(21) Appl. No.: 13/157,655

(22) Filed: Jun. 10, 2011

(65) Prior Publication Data

US 2011/0314015 A1  Dec. 22, 2011

(30) Foreign Application Priority Data

Jun. 17, 2010 (JP) ................................ P2010-138604

(51) Int. Cl.
*G06F 17/30* (2006.01)
(52) U.S. Cl.
USPC ......................................................... 707/736
(58) Field of Classification Search
None
See application file for complete search history.

(56) References Cited

U.S. PATENT DOCUMENTS

| 6,134,378 | A  | * | 10/2000 | Abe et al. ...................... 386/282 |
| 6,275,529 | B1 | * | 8/2001  | Sato .......................... 375/240.01 |
| 2004/0218902 | A1 | * | 11/2004 | Yanagita ......................... 386/52 |
| 2005/0188319 | A1 | * | 8/2005  | Shinkai ......................... 715/751 |
| 2007/0025693 | A1 | * | 2/2007  | Shibata et al. ................... 386/95 |
| 2009/0067818 | A1 | * | 3/2009  | Tokunaka et al. ............. 386/124 |

FOREIGN PATENT DOCUMENTS

| JP | 2002-77807 | 3/2002 |
| JP | 2006-42317 | 2/2006 |
| JP | 4404247    | 11/2009 |

* cited by examiner

*Primary Examiner* — Bai D. Vu
(74) *Attorney, Agent, or Firm* — Frommer Lawrence & Haug LLP; William S. Frommer

(57) ABSTRACT

An information processing apparatus includes a creating block configured to create relating information for relating each of one or more news gathering materials that are data obtained as a result of news gathering in accordance with predetermined news gathering contents with an On Air material, which is abbreviated to OA material, obtained as a result of editing the one or more news gathering materials.

7 Claims, 23 Drawing Sheets

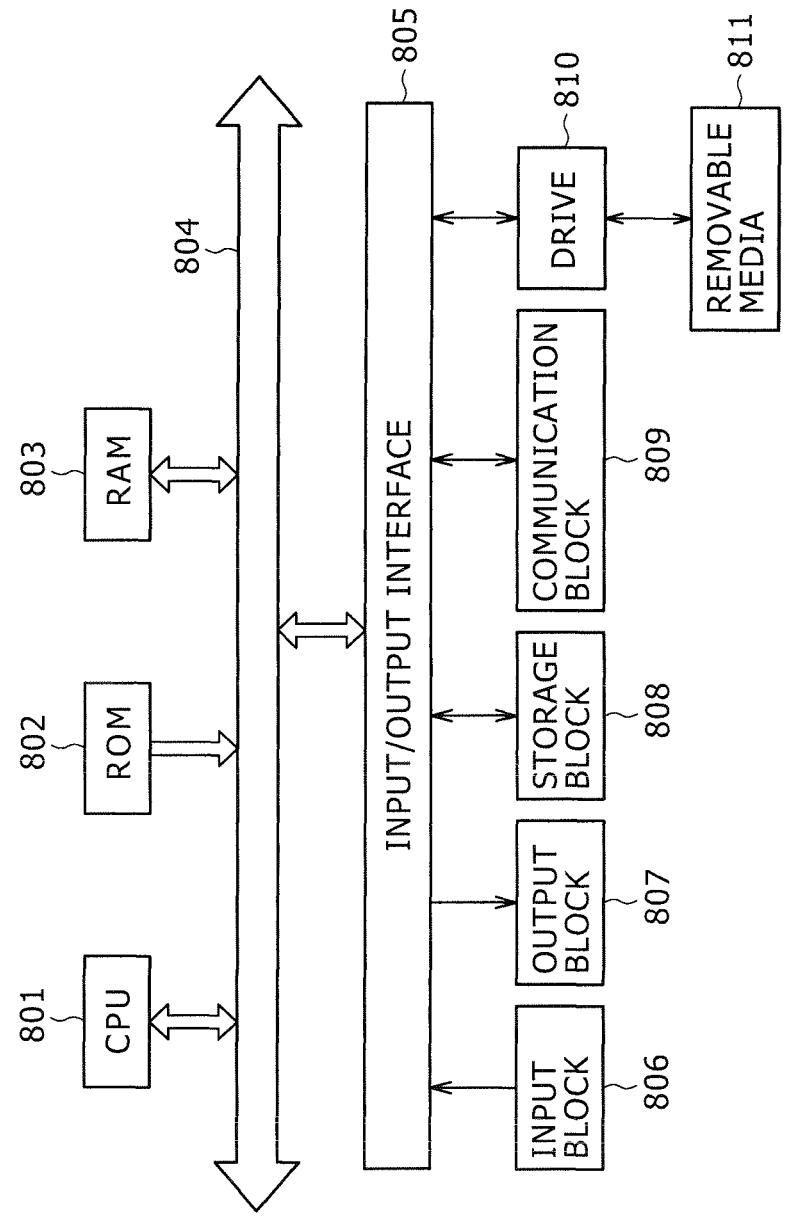

INFORMATION PROCESSING APPARATUS AND METHOD, PROGRAM, AND INFORMATION PROCESSING SYSTEM

BACKGROUND

The present disclosure relates to an information processing apparatus and method, a program, and an information processing system and, more particularly, to an information processing apparatus and method, a program, and an information processing system that are configured to facilitate searching from one of materials before and after editing to another.

In producing and broadcasting news report programs, broadcasting stations and program production firms execute the following sequence of jobs. To be specific, preparations are made for program production, news are gathered, data (hereafter referred to as news gathering material) obtained by news gathering is edited, the edited news gathering material (hereafter referred to as OA (On-Air) material) is broadcast, and the broadcast OA material is recorded. In such a series of jobs, each job is supported by various apparatuses. A system composed of these apparatuses is generally referred to as a news report support system. Related-art news report support systems are disclosed in Japanese Patent Laid-open No. 2002-77807, U.S. Pat. No. 4,404,247, and Japanese Patent Laid-open No. 2006-42317 (hereinafter referred to as Patent Documents 1 through 3, respectively).

Using a news report support system such as mentioned above, a broadcasting station and a program production firm are able to search the stored OA materials for a desired OA material.

SUMMARY

However, if any of the related-art news report support systems including Patent Documents 1 through 3 above is used, it is difficult for broadcasting stations or program production firms to search predetermined OA materials for a pre-edit news gathering material. Conversely, this difficulty still remains in searching predetermined pre-edit news gathering materials for a post-edit OA material. The following further describes difficulties involved in executing searching from one to another of the materials before and after editing.
Related-Art News Report Support System Referring to FIG. 1, there is shown a block diagram illustrating an exemplary configuration of a related-art news report support system.

As shown in FIG. 1, a related-art news report support system 1 is made up of apparatuses used in a news report department 11, a news gathering department 12, an editing department 13, and a transmission department 14.

It should be noted that the jobs of the news report department 11, the news gathering department 12, the editing department 13, and the transmission department 14 are actually executed by human beings by use of the apparatuses arranged in these departments. For the convenience of description, it is assumed that each of these jobs is executed by the department concerned rather than the human being concerned.

The news report department 11 creates the contents of news gathering and the contents of programs as the previous arrangements for program production. In order to support these previous arrangements, the news report department 11 has a news gathering item creation terminal 31, a program item creation terminal 32, and a recording apparatus 33. The news gathering item creation terminal 31, the program item creation terminal 32, and the recording apparatus 33 are interconnected by a news report department LAN (Local Area Network) 34.

The news gathering department 12 executes news gathering in accordance with the news gathering contents created by the news report department 11. In order to execute this job, an imaging apparatus 35 is arranged in the news gathering department 12. To be more specific, the imaging apparatus 35 takes images of a subject of news gathering and records resultant data to a removable recording media 36 as a news gathering material.

The removable recording media 36 recording such news gathering materials is sent from the news gathering department 12 to the editing department 13. The editing department 13 edits the news gathering materials recorded to the removable recording media 36 to create an OA material. In order to executing this editing processing, an editing terminal 37 is arranged in the editing department 13.

The transmission department 14 broadcasts news report programs by use of the OA material created by the editing department 13. In order to execute the broadcasting such as mentioned above, the transmission department 14 has an OA server management terminal 38, an OA server 39, and a broadcasting apparatus 40. The OA server management terminal 38 is interconnected with each apparatus arranged in the news report department 11 through the news report department LAN 34. The OA server management terminal 38 is also directly connected to the OA server 39 with a cable or the like. The OA server 39 is directly connected to both the editing terminal 37 in the editing department 13 and the broadcasting apparatus 40.

The following describes the flow of processing to be executed by the above-mentioned related-art news report support system with reference to the flowchart shown in FIG. 2.
Processing by Related-Art News Report Support System 1

FIG. 2 shows the flowchart indicative of the flow of the related-art news report support system 1.

It should be noted that, because the processing of the news report department 11 and the processing of the transmission department 14 are closely related with each other, the processing operations of these two departments will be described together, hereafter being referred to as news report/transmission processing. The processing operations of the news gathering department 12 will be referred to as news gathering processing and the processing operations of the editing department 13 will be referred to as editing processing.

When the news report department 11 determines a news gathering item and enters the contents of the determined news gathering item into the news gathering item creation terminal 31, the news report/transmission processing starts. The news gathering item is a list of items of information, such as news gathering locations and cameraman names for example.

To be more specific, in step S1, the news gathering item creation terminal 31 creates the data of news gathering item on the basis of the contents entered from the news report department 11.

The news gathering item created in step S1 as data is printed to a paper media by a printer apparatus (not shown) connected to the news gathering item creation terminal 31. The printed news gathering item is handed out from the news report department 11 to the news gathering department 12. It should be noted that the processing operations of step S2 and subsequent steps will be described later.

The news gathering department 12 goes to the location of the subject of news gathering in accordance with the handed news gathering item to start news gathering. Then, the following news gathering processing is executed by the imaging apparatus 35.

In step S21, the imaging apparatus 35 images the subject of news gathering.

In step S22, the imaging apparatus 35 records the data obtained by the imaging of the subject of news gathering to the removable recording media 36 as a news gathering material.

Now, the news gathering processing has been completed.

Upon completion of the news gathering processing, the news gathering department 12 removes the removable recording media 36 recording the news gathering material from the imaging apparatus 35 and hands out this removable recording media 36 to the editing department 13. The editing department 13 loads the removable recording media 36 on the editing terminal 37 and instructs the editing terminal 37 to start editing processing, upon which the editing processing as follows starts.

In step S41, the editing terminal 37 reads the news gathering material from the loaded removable recording media 36.

In step S42, the editing terminal 37 edits the news gathering material into the data suitable for broadcasting as instructed by the editing department 13.

In step S43, the editing terminal 37 transfers the data obtained as a result the processing of step S42 to the OA server 39 of the transmission department 14 as an OA material.

Here, the editing processing has been completed.

Now, the description returns to the news gathering/transmission processing. Until the OA material is transferred to the OA server 39 by the processing of step S43 of editing processing, the processing of step S2 and the processing of step S3 are executed in the news gathering/transmission processing.

To be more specific, when the data of the news gathering item is created by the above-mentioned processing of step S1, the data of the news gathering item is transmitted from the news gathering item creation terminal 31 to the program item creation terminal 32 through the news report department LAN 34. This causes the processing to move to step S2.

In step S2, the program item creation terminal 32 creates the data of a program item on the basis of the received data of the news gathering item. The program item is a list of information such as names and broadcasting dates of programs.

In step S3, the program item creation terminal 32 transfers the data of the created program item to the OA server management terminal 38 of the transmission department 14 through the news report department LAN 34.

Thus, when the data of the program item is transferred to the OA server management terminal 38 by the processing of step S3 and the OA material is transferred from the editing terminal 37 to the OA server 39 by the processing of step S43 of the above-mentioned editing processing, then the procedure goes to step S4.

In step S4, the OA server 39 receives and records the received OA material.

In step S5, the OA server management terminal 38 registers the ID and so on of the OA material recorded to the OA server 39, transfers the data of the program item to the recording apparatus 33 of the news report department 11, and records the data of the program item thereto.

Then, the OA server management terminal 38 monitors the data of the program item recorded to the recording apparatus 33. When the date of broadcasting the program registered in that program item comes, the OA server management terminal 38 executes control of transmitting the OA material identified by the ID and so on registered in the program item from the OA server 39 to the broadcasting apparatus 40 by use of an OTC (One Touch Controller) system. The OTC system is a system configured to control the progression of a program with only one button. Therefore, when the button of the OTC system is pressed by the transmission department 14, the OA server management terminal 38 transmits the OA material from the OA server 39 to the broadcasting apparatus 40. Consequently, the procedure goes to step S6.

In step S6, the broadcasting apparatus 40 broadcasts the news report program by use of the OA material received from the OA server 39.

Here, the news gathering/transmission processing has been computed.

As described above, in the related-art news report support system 1, the edited OA material is not related with a news gathering material before editing at all. Namely, in the related art, the news gathering materials before editing are only recorded to the removable recording media 36 and the OA material after editing is only recorded to the OA server 39 regardless of this removable recording media 36. Therefore, if the related-art news report support systems disclosed in Patent Documents 1 through 3 are used, it is difficult for each department to execute search from one to another, namely, search between the news gathering material before editing and the OA material obtained after editing.

Therefore, the present disclosure addresses the above-identified and other problems associated with related-art methods and apparatuses and solves the addressed problems by providing an information processing apparatus and method, a program, and an information processing system that are configured to facilitate the search between the materials before and after editing.

In carrying out the disclosure and according to one embodiment thereof, there is provided an information processing apparatus. This information processing apparatus has a creating block configured to create relating information for relating each of one or more news gathering materials that are data obtained as a result of news gathering in accordance with predetermined news gathering contents with an On Air material, which is abbreviated to OA material, obtained as a result of editing the one or more news gathering materials. On the basis of news gathering metadata that is link information for relating the news gathering contents with the each of one or more news gathering materials by including a news gathering Identifier, which is abbreviated to ID, for identifying the news gathering contents and a material information ID for identifying each of the one or more news gathering materials; program metadata for broadcasting the OA material related with the news gathering contents, the program metadata including the news gathering ID and an OA transmission information ID for identifying the OA material that is a subject of broadcasting; and OA transmission material information associated with the OA material that is a subject to be broadcast in accordance with the program metadata, the OA transmission material information including the OA transmission information ID and an OA transmission material ID for identifying the OA material itself, the creating block creates information including the OA transmission material ID, the OA transmission information ID, the news gathering ID, and the material information ID as the relating information.

The above-mentioned news gathering metadata is recorded to a first apparatus separate from a recording media to which the news gathering material was recorded at news gathering; the program metadata is recorded to the first apparatus; the OA transmission material information is recorded to a second apparatus to which the OA material is recorded; and the creating block references the program metadata and the news gathering metadata by communication with the first apparatus and creates the relating information by referencing the OA transmission material information by communication with the second apparatus.

The above-mentioned program metadata is recorded to a first apparatus; the news gathering metadata is recorded to a recording media to which the news gathering material was recorded at news gathering and is recorded to the first apparatus via the recording media; the OA transmission material information is recorded to a second apparatus to which the OA material is recorded; and the creating block references the program metadata and the news gathering metadata by communication with the first apparatus and creates the relating information by referencing the OA transmission material information by communication with the second apparatus.

In carrying out the disclosure and according to another embodiment thereof, there are provided an information processing method and an program that correspond to the above-mentioned information processing apparatus practiced as one embodiment of the disclosure.

In the above-mentioned information processing apparatus, information processing method, and program, relating information is created for relating each of one or more news gathering materials that are data obtained as a result of news gathering executed in accordance with predetermined news gathering contents with an OA material that is data obtained as a result of editing above-mentioned one or more news gathering materials. The news gathering ID for identifying the above-mentioned news gathering contents and the material information ID for identifying each of above-mentioned one or more news gathering materials are included in the relating information. Consequently, on the basis of news gathering metadata that is link information by which the above-mentioned news gathering contents are related with each of above-mentioned one or more news gathering materials; program metadata for broadcasting the above-mentioned OA material corresponding to the above-mentioned news gathering contents, this program metadata including the above-mentioned news gathering ID and the OA transmission information ID for identifying that the OA material is to be broadcast; and OA transmission material information associated with the above-mentioned OA material to be broadcast in accordance with the above-mentioned program metadata, this OA transmission material information including the above-mentioned OA transmission information ID and the OA transmission material ID for identifying the above-mentioned OA material itself, information including the above-mentioned OA transmission material ID, the above-mentioned OA transmission information ID, the above-mentioned news gathering ID, and the above-mentioned material information ID is created as the relating information.

In carrying out the disclosure and according to still another embodiment thereof, there is provided an information processing system. In this information processing system, a news report department apparatus creates news gathering metadata including a news gathering ID for identifying news gathering contents and transmits the created news gathering metadata to a news gathering department apparatus; the news gathering department apparatus receives the news gathering metadata and records at least one piece of data obtained as a result of news gathering executed in accordance with the news gathering contents to a recording media as a news gathering material; the news gathering department apparatus further includes a material information ID for identifying each of the at least one news gathering material into the news gathering metadata in addition to the news gathering ID and transmits the news gathering metadata to the news report department apparatus as news gathering metadata as link information for relating the news gathering contents with the at least one news gathering material; the news report department apparatus receives the news gathering metadata as the link information and records the received news gathering metadata; an editing department apparatus edits the at least one news gathering material obtained from the recording media and transmits data obtained as a result of the editing to a transmission department apparatus as an OA material; the transmission department apparatus records the OA material and OA transmission material information including an OA transmission information ID for identifying the OA material as a subject of broadcasting and an OA transmission material ID for identifying the OA material itself; the news report department apparatus creates program metadata including the news gathering ID and transmits the program metadata to the transmission department apparatus, the program metadata being for broadcasting the OA material corresponding to the news gathering contents; the transmission department apparatus includes the OA transmission information ID into the program metadata and transmits the program metadata included with the OA transmission information ID to the news report department apparatus; the news report department apparatus records the program metadata included with the OA transmission information ID; and, after broadcasting the OA material in accordance with the program metadata included with the OA transmission information ID, the transmission department apparatus creates information including the OA transmission material ID, the OA transmission information ID, the news gathering ID, and the material information ID on the basis of the news gathering metadata, the program metadata, and the OA transmission material information as the link information obtained from the news report department apparatus as relating information for relating each of the at least one news gathering material with the OA material.

In the above-mentioned information processing system according to still another embodiment of the disclosure, news gathering metadata including a news gathering ID for identifying news gathering contents is created and transmitted to the news gathering department apparatus by the news report department apparatus. The above-mentioned news gathering metadata is received by the news gathering department apparatus and one or more pieces of data obtained as a result of the news gathering are recorded to a recording media as one or more mews gathering materials in accordance with the above-mentioned news gathering contents. A material information ID for identifying each of the above-mentioned one or more news gathering materials is included by the news gathering department apparatus into the above-mentioned news gathering metadata in addition to the above-mentioned news gathering ID and the resultant news gathering metadata is transmitted to the news report department apparatus as link information for relating the above-mentioned news gathering contents with each of the above-mentioned one or more news gathering materials. The above-mentioned news gathering metadata as the link information is received and recorded by the news report department apparatus. The above-mentioned one or more news gathering materials obtained from the above-mentioned recording media are edited and the resultant data is transmitted by the editing department apparatus to the transmission department apparatus as an OA material. This OA material and OA transmission material information are recorded by the transmission department apparatus, this OA transmission material information including an OA transmission information ID for identifying that the above-mentioned OA material is to be broadcast and an OA transmission material ID for identifying the above-mentioned OA material itself. Program metadata for broadcasting the above-mentioned OA material corresponding to the above-mentioned news gathering contents is created by the news report department apparatus, this program metadata being including the above-mentioned news gathering ID, and the created program metadata is transmitted from the news report department apparatus to the transmission department apparatus. The above-mentioned OA transmission information ID is included in the above-mentioned program metadata by the transmission department apparatus and this program metadata included with the OA transmission information ID is transmitted by the transmission department apparatus to the above-mentioned news report department apparatus. The program metadata included with the above-mentioned OA transmission information ID is recorded by the news report department apparatus. After the broadcasting of the above-mentioned OA material in accordance with the program metadata included with the above-mentioned OA transmission information ID, information including the OA transmission material ID, the OA transmission information ID, the news gathering ID, and the material information ID is created by the transmission department apparatus on the basis of the news gathering metadata, the program metadata, and the OA transmission material information as the link information obtained from the news report department apparatus as relating information for relating each of the at least one news gathering material with the OA material.

In carrying out the disclosure and according to yet another embodiment thereof, there is provided an information processing system. In this information processing system, a news report department apparatus creates news gathering metadata including a news gathering ID for identifying news gathering contents and transmits the created news gathering metadata to a news gathering department apparatus; the news gathering department apparatus receives the news gathering metadata and records at least one piece of data obtained as a result of news gathering executed in accordance with the news gathering contents to a recording media as a news gathering material; the news gathering department apparatus further includes a material information ID for identifying each of the at least one news gathering material into the news gathering metadata in addition to the news gathering ID and records the news gathering metadata included with the material information ID to the recording media to which the news gathering material is recorded as news gathering metadata as link information for relating the news gathering contents with the at least one news gathering material; the editing department apparatus edits the at least one news gathering material obtained from the recording media and transmits data obtained as a result of the editing to a transmission department apparatus as an OA material; the transmission department apparatus records the OA material and OA transmission material information including an OA transmission information ID for identifying the OA material as a subject of broadcasting and an OA transmission material ID for identifying the OA material itself; upon demand from the transmission department apparatus, the editing department apparatus transmits the news gathering metadata to the transmission department apparatus as the link information obtained from the recording media; the news report department apparatus records the news gathering metadata as the link information received by the transmission department apparatus; the news report department apparatus creates program metadata including the news gathering ID, the program metadata being for broadcasting the OA material corresponding to the news gathering contents and transmits the program metadata to the transmission department apparatus; the transmission department apparatus includes the OA transmission information ID into the program metadata and transmits the program metadata included with the OA transmission information ID to the news report department apparatus; the news report department apparatus records the program metadata included with the OA transmission information ID; and after broadcasting the OA material in accordance with the program metadata included with the OA transmission information ID, the transmission department apparatus creates information including the OA transmission material ID, the OA transmission information ID, the news gathering ID, and the material information ID on the basis of the news gathering metadata, the program metadata, and the OA transmission material information as the link information obtained from the news report department apparatus as relating information for relating each of the at least one news gathering material with the OA material.

In the above-mentioned information processing system according to yet another embodiment of the disclosure, news gathering metadata including a news gathering ID for identifying news gathering contents is created by the news report department apparatus and the created news gathering metadata is transmitted to a news gathering department apparatus. The news gathering metadata is received by the news gathering department apparatus and at least one piece of data obtained as a result of news gathering executed in accordance with the news gathering contents is recorded to a recording media as a news gathering material. A material information ID for identifying each of the at least one news gathering material is included by the news gathering department apparatus into the news gathering metadata in addition to the news gathering ID and the news gathering metadata included with the material information ID is recorded to the recording media to which the news gathering material is recorded as news gathering metadata as link information for relating the news gathering contents with the at least one news gathering material. The at least one news gathering material obtained from the recording media is edited by the editing department apparatus and data obtained as a result of the editing is transmitted to a transmission department apparatus as an OA material. The OA material and OA transmission material information including an OA transmission information ID for identifying the OA material as a subject of broadcasting and an OA transmission material ID for identifying the OA material itself are recorded by the transmission department apparatus. Upon demand from the transmission department apparatus, the news gathering metadata is transmitted by the editing department apparatus to the transmission department apparatus as the link information obtained from the recording media. The news gathering metadata is recorded by the news report department apparatus as the link information received by the transmission department apparatus. Program metadata including the news gathering ID is created by the news report department apparatus, the program metadata being for broadcasting the OA material corresponding to the news gathering contents and transmitted to the transmission department apparatus. The OA transmission information ID is included by the transmission department apparatus into the program metadata and the program metadata included with the OA transmission information ID is transmitted to the news report department apparatus. The program metadata included with the OA transmission information ID is recorded by the news report department apparatus. And, after broadcasting the OA material in accordance with the program metadata included with the OA transmission information ID, information including the OA transmission material ID, the OA transmission information ID, the news gathering ID, and the material information ID is created by the transmission department apparatus on the basis of the news gathering metadata, the program metadata, and the OA transmission material information as the link information obtained from the news report department apparatus as relating information for relating each of the at least one news gathering material with the OA material.

As described above and according the embodiments of the present disclosure, search between the materials before and after editing is facilitated.

BRIEF DESCRIPTION OF THE DRAWINGS

FIG. 27 is a block diagram illustrating an exemplary hardware configuration of an information processing apparatus to which the present disclosure is applied.

DETAILED DESCRIPTION OF THE PREFERRED EMBODIMENTS

This disclosure will be described in further detail by way of embodiments thereof with reference to the accompanying drawings. The following describes a news report support system in two embodiments (hereafter referred to as a first embodiment and a second embodiment) of the present disclosure in the following order.

(1) First embodiment (an example in which link information is transferred from a news gathering department to a news report department); and (2) Second embodiment (an example in which a material server is monitored).

(1) First Embodiment

Figure 1:
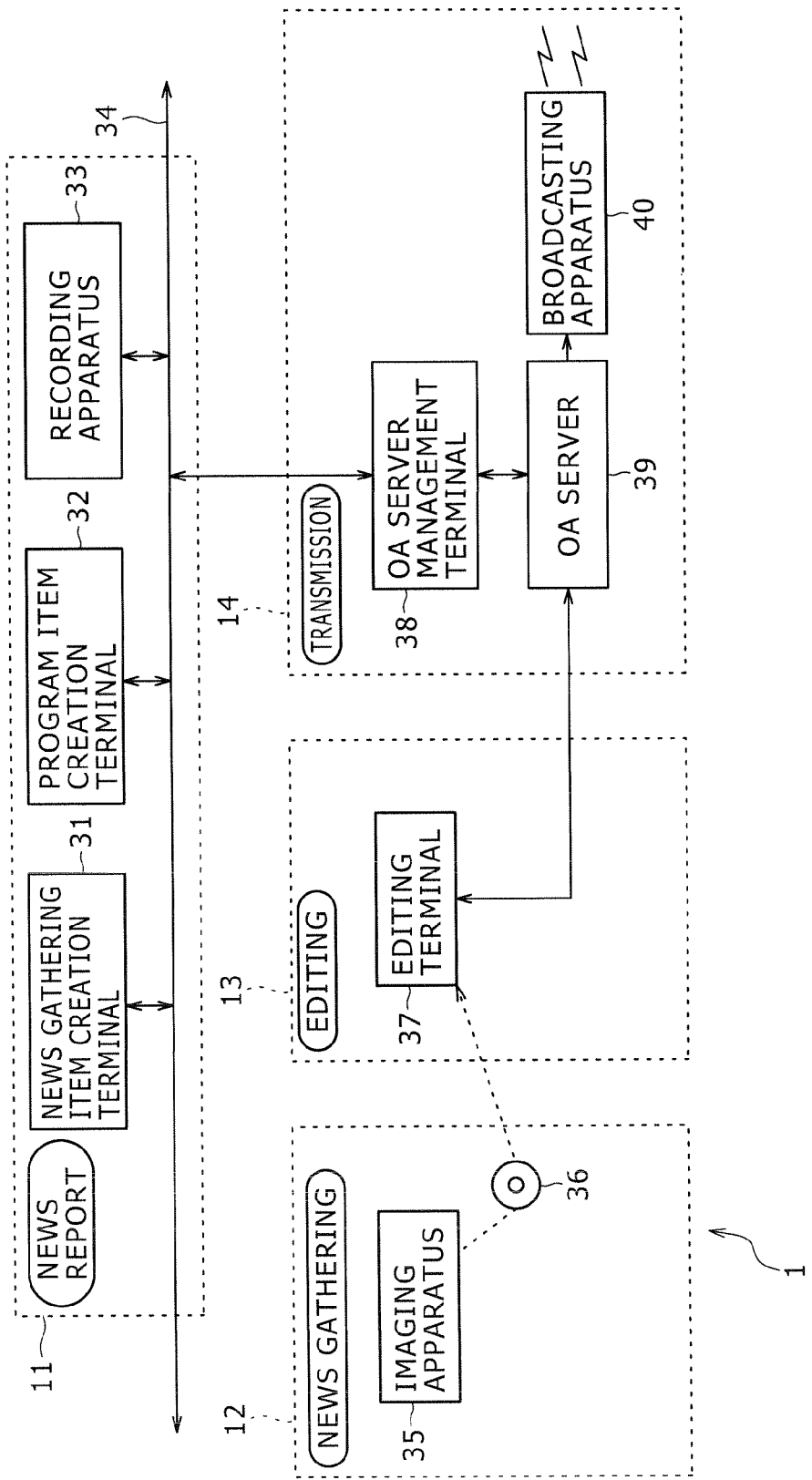
FIG. 1 is a block diagram illustrating an exemplary configuration of a related art news report support system.
Figure 2:
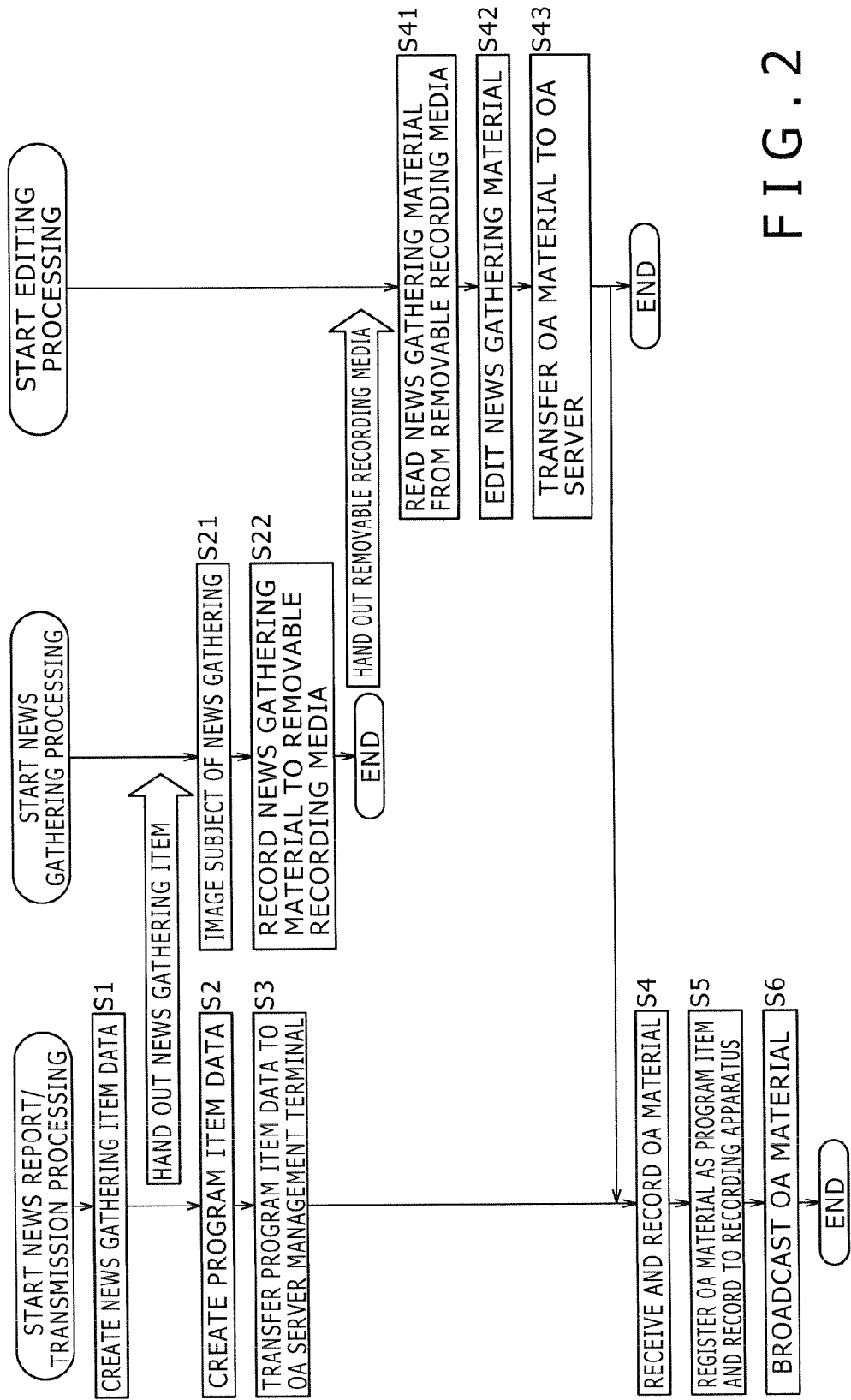
FIG. 2 is a flowchart indicative of a flow of processing by the related-art news report support system.
Figure 3:
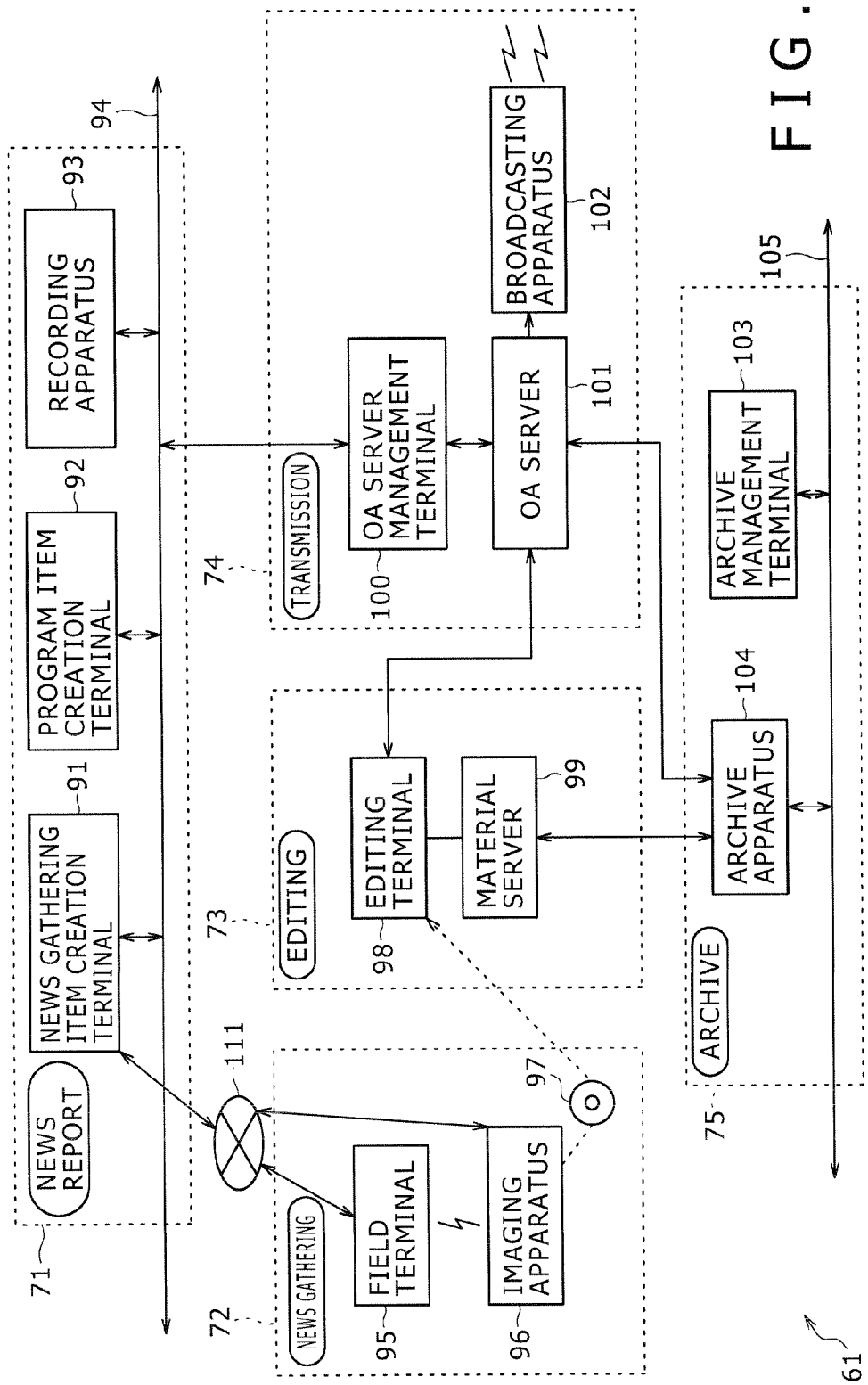
FIG. 3 is a block diagram illustrating an exemplary configuration of a news report support system practiced as a first embodiment of the disclosure.

Exemplary Configuration of News Report Support System Practiced as the First Embodiment Now, with reference to FIG. 3, there is shown a block diagram illustrating the news report support system practiced as the first embodiment of the disclosure.

As shown in FIG. 3, a news report support system 61 practiced as the first embodiment is made up of apparatuses used in a news report department 71, a news gathering department 72, an editing department 73, a transmission department 74, and an archive department 75.

It should be noted that the jobs of the news report department 71, the news gathering department 72, the editing department 73, the transmission department 74, and the archive department 75 are actually executed by human beings by use of the apparatuses arranged in these departments. For the convenience of description, it is assumed that each of these jobs is executed by the department concerned rather than the human being concerned.

The news report department 71 creates the contents of news gathering and the contents of programs as the previous arrangements for program production. In order to support these previous arrangements, the news report department 71 has a news gathering item creation terminal 91, a program item creation terminal 92, and a recording apparatus 93. The news gathering item creation terminal 91, the program item creation terminal 92, and the recording apparatus 93 are interconnected by a news report department LAN 94. The news report department LAN 94 is also connected to a predetermined external network 111 such as the Internet. Therefore, the news gathering item creation terminal 91, program item creation terminal 92, and recording apparatus 93 can communicate with each other via the news report department LAN 94 and communicate with other devices connected to the external network 111. Details being described later, the news gathering item creation terminal 91 transfers data about each information associated with the contents of news gathering (hereafter referred to as news gathering metadata) to a field terminal 95 via the external network 111 in the first embodiment, for example.

The news gathering department 72 executes news gathering in accordance with the contents of news gathering created by the news report department 71. In order to execute this news gathering, the news gathering department 72 has the field terminal 95 and an imaging apparatus 96. To be more specific, the field terminal 95 and the imaging apparatus 96 are portable and can be connected to the external network 111 to communicate other devices connected thereto. In addition, the field terminal 95 and the imaging apparatus 96 can wirelessly communicate with each other by use of infrared communication or the like. Detail being described later, the field terminal 95 receives news gathering metadata transferred from the news gathering item creation terminal 91 via the external network 111 at a news gathering location in the first embodiment, for example. Then, by use of the received news gathering metadata, the field terminal 95 creates data (hereafter referred to as link information source data) providing the source of information (hereafter referred to as link information) for relating the contents of news gathering created by news report department 71 with the news gathering material and wirelessly transmits the created data to the imaging apparatus 96. In accordance with the received link information source data, the imaging apparatus 96 images the subject of news gathering at the news gathering location and records the imaged data to a removable recording media 97 as a news gathering material. In addition, the imaging apparatus 96 generates link information from the link information source data and transfers the created link information to the recording apparatus 93 of the news report department 71 via the external network 111 as one of news gathering metadata.

On the other hand, the removable recording media 97 to which the news gathering material is recorded is sent from the news gathering department 72 to the editing department 73. The editing department 73 edits the news gathering material recorded to the removable recording media 97 to create an OA material. In order to achieve this editing processing, the editing department 73 has an editing terminal 98 and a material server 99. The editing terminal 98 is directly connected to the material server 99 and an OA server 101 of the transmission department 74 with a cable or the like. Details being descried later, the editing terminal 98 creates an OA material that includes an element for relating the program contents created by the news report department 71 with the OA material and transfers the created OA material to the OA server 101 of the transmission department 74 in the first embodiment, for example.

By use of the OA material created by the editing department 73, the transmission department 74 broadcasts a news report program. In order to achieve this broadcasting, the transmission department 74 has an OA server management terminal 100, the OA server 101, and a broadcasting apparatus 102. The OA server management terminal 100 is interconnected to each apparatus arranged in the news report department 71 by the news report department LAN 94. The OA server management terminal 100 is also directly connected to the OA server 101 with a cable or the like. The OA server 101 is directly connected to the broadcasting apparatus 102, the editing terminal 98 of the editing department 73, and an archive apparatus 104 of the archive department 75. In addition, the broadcasting apparatus 102 builds an OTC system. Details being described later, the OA server management terminal 100 relates the OA material with the program contents created by the news report department 71 in the first embodiment, for example. Further, the OA server management terminal 100 creates an archive list that is a list of various kinds of information as each element for relating the OA material with the news gathering material before being edited into this OA material and transfers the created archive list to an archive management terminal 103 of the archive department 75.

The archive department 75 stores the news gathering material and the OA material in accordance with the archive list. In order to achieve this storage, the archive department 75 has an archive management terminal 103 and the archive apparatus 104. The archive management terminal 103 and the archive apparatus 104 are interconnected by an archive department LAN 105. The archive apparatus 104 is also directly connected to the material server 99 of the editing department 73 and the OA server 101 of the transmission department 74. Detail being described later, the archive management terminal 103 transfers the news gathering material and the OA material from the material server 99 and the OA server 101, respectively, in accordance with the archive list, in the first embodiment, for example. Then, the archive management terminal 103 stores the OA material and the news gathering material as related with each other.

The following describes an exemplary functional configuration of the news report support system 61 as described above, with reference to FIG. 4 through FIG. 8.

Exemplary Functional Configuration of Each Department of News Report Support System 61

Referring to FIG. 4 through FIG. 8, there are shown block diagrams illustrating the exemplary functional configurations of the departments making up the news report support system 61.

Figure 4:
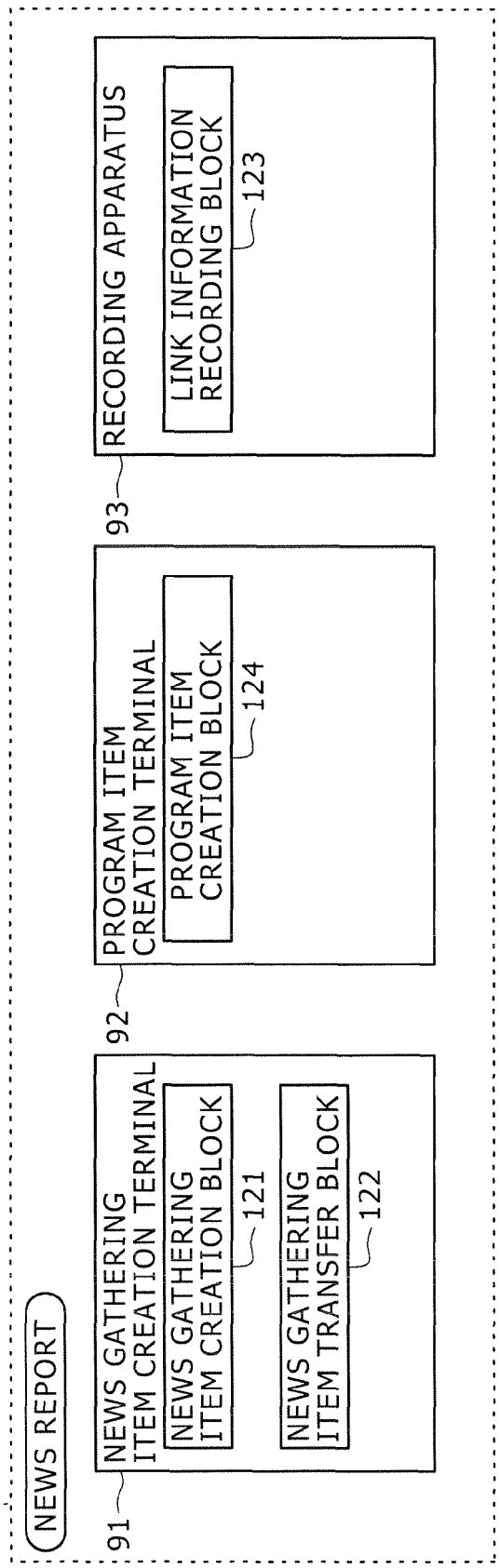
FIG. 4 is a block diagram illustrating an exemplary functional configuration of a news report department of the news report support system of the first embodiment.

FIG. 4 shows a block diagram of the exemplary functional configuration of the news report department 71.

The news gathering item creation terminal 91 has a news gathering item creation block 121 and a news gathering item transfer block 122. The program item creation terminal 92 has a program item creation block 124. The recording apparatus 93 has a link information recording block 123.

Figure 5:
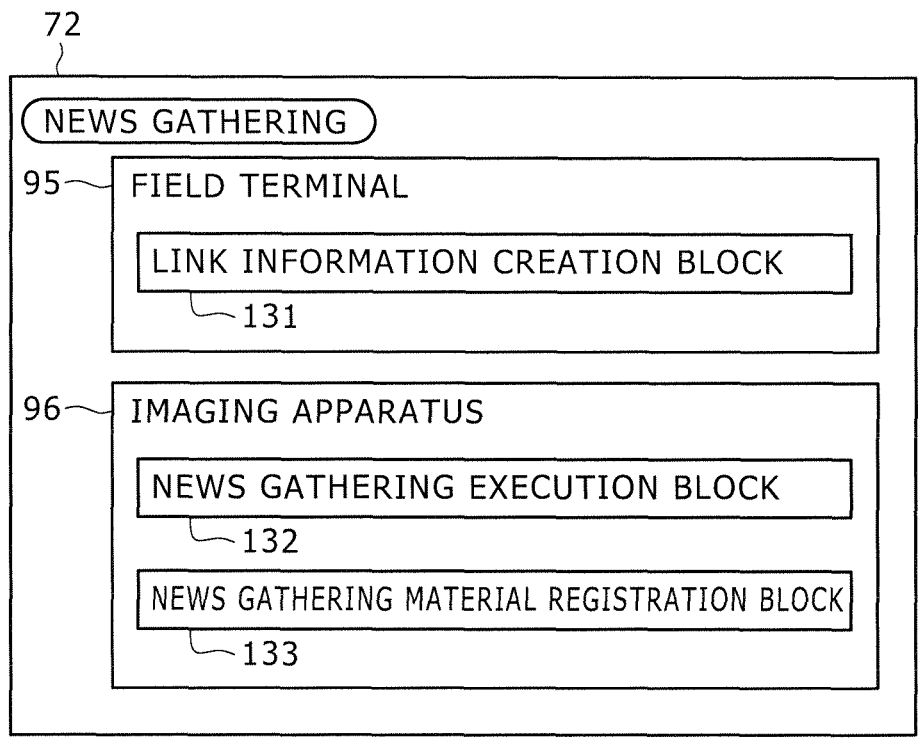
FIG. 5 is a block diagram illustrating an exemplary functional configuration of a news gathering department of the news report support system of the first embodiment.

FIG. 5 is a block diagram showing the exemplary functional configuration of the news gathering department 72.

The field terminal 95 has a link information creation block 131. The imaging apparatus 96 has a news gathering execution block 132 and a news gathering material registration block 133.

Figure 6:
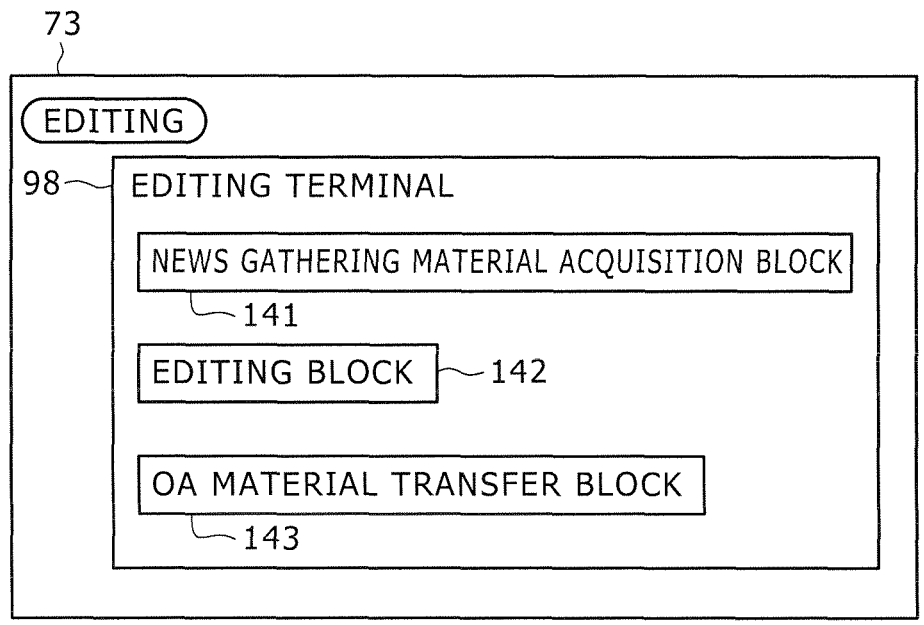
FIG. 6 is a block diagram illustrating an exemplary functional configuration of an editing department of the news report support system of the first embodiment.

FIG. 6 is a block diagram showing the exemplary functional configuration of the editing department 73.

The editing terminal 98 has a news gathering material acquisition block 141, an editing block 142, and an OA material transfer block 143.

Figure 7:
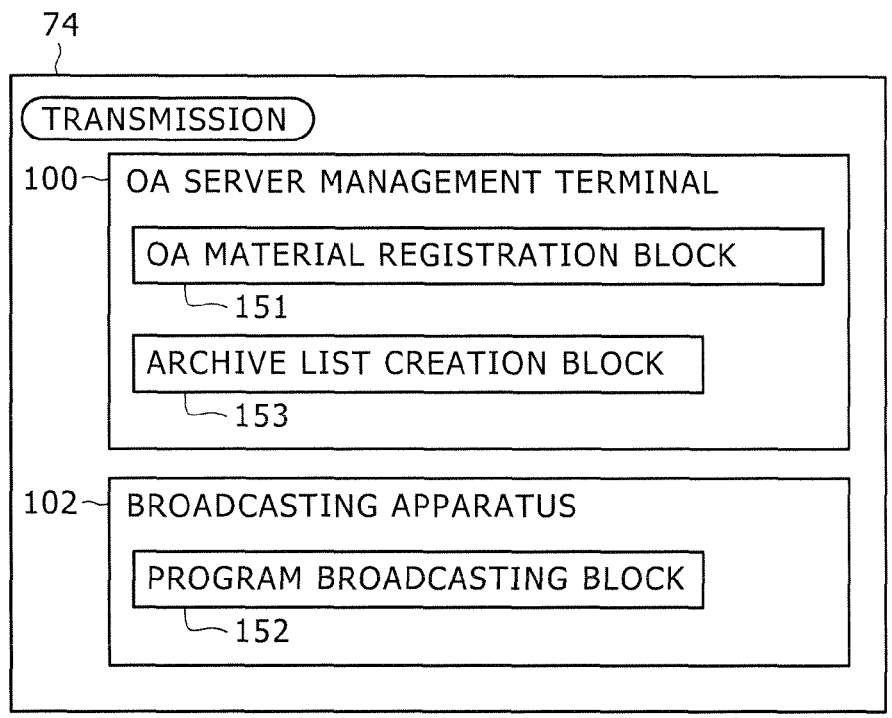
FIG. 7 is a block diagram illustrating an exemplary functional configuration of a transmission department of the news report support system of the first embodiment.

FIG. 7 is a block diagram showing the exemplary functional configuration of the transmission department 74.

The OA server management terminal 100 has an OA material registration block 151 and an archive list creation block 153. The broadcasting apparatus 102 has a program broadcasting block 152.

Figure 8:
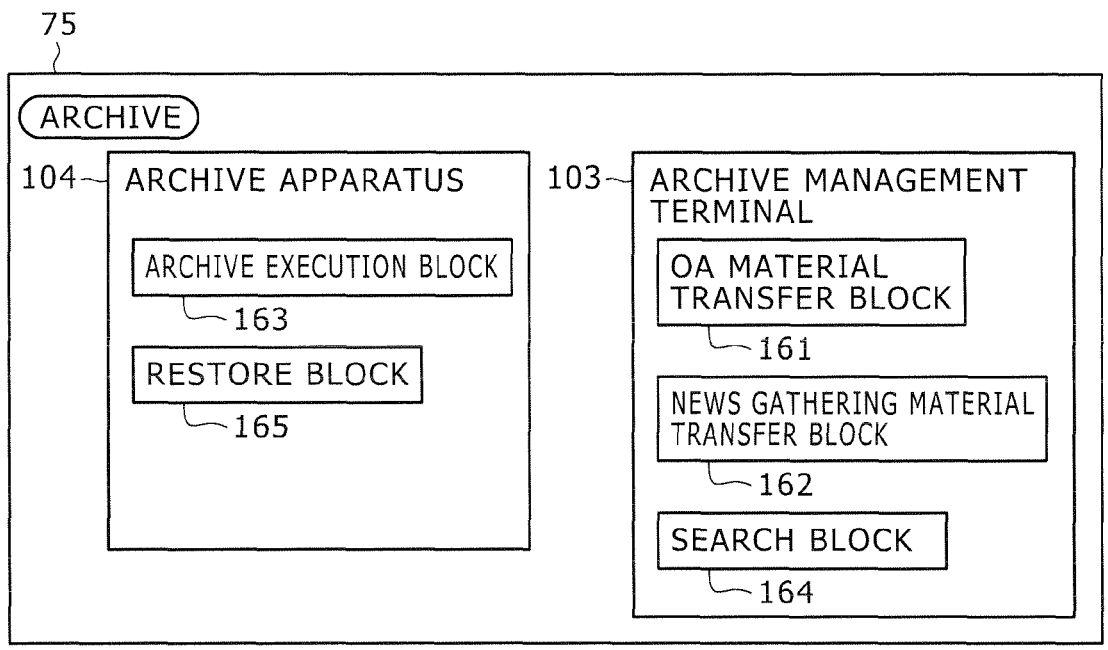
FIG. 8 is a block diagram illustrating an exemplary functional configuration of an archive department of the news report support system of the first embodiment.

FIG. 8 is a block diagram showing the exemplary functional configuration of the archive department 75.

The archive management terminal 103 has an OA material transfer block 161, a news gathering material transfer block 162, and a search block 164. The archive apparatus 104 has an archive execution block 163 and a restore block 165.

Figure 9:
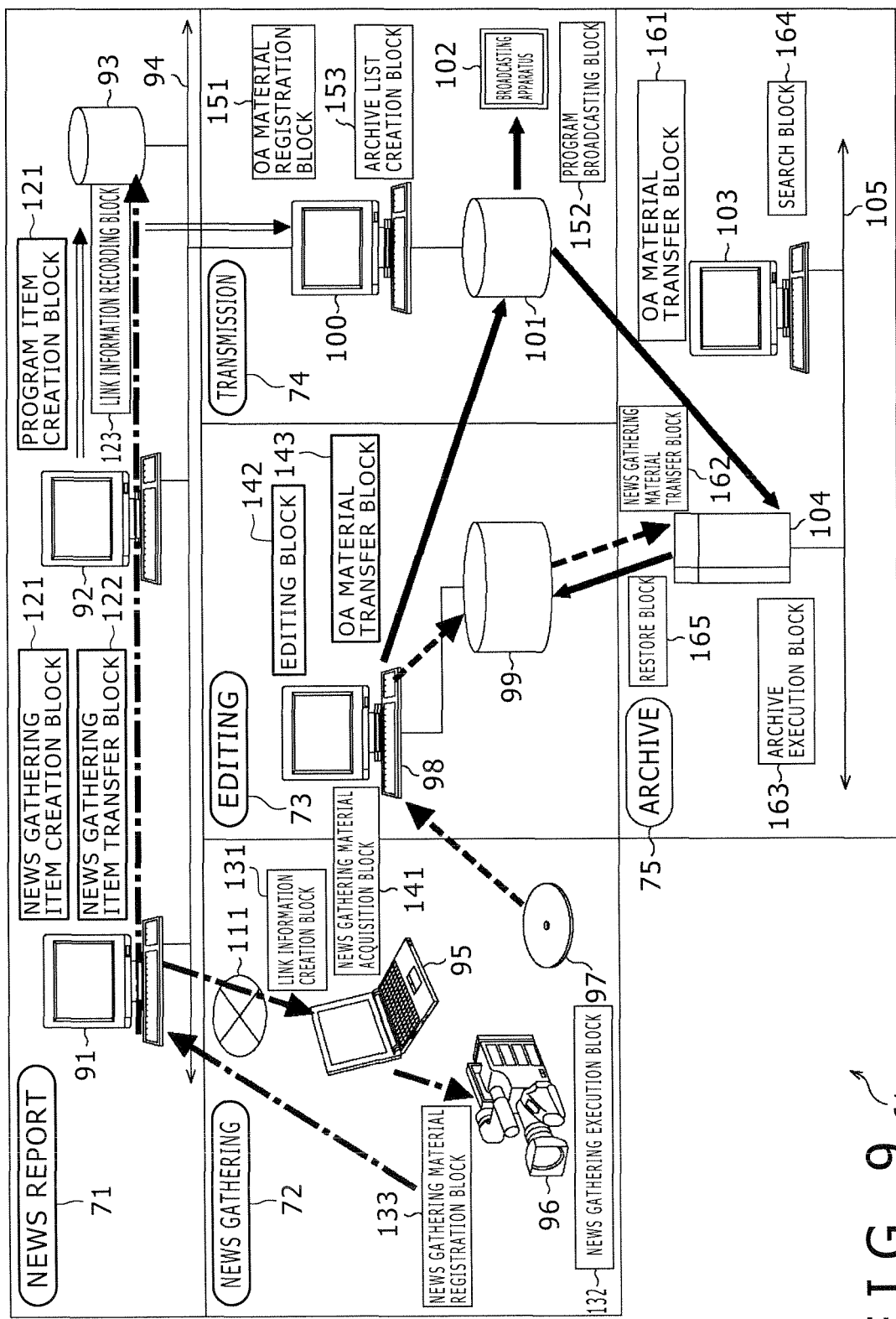
FIG. 9 is a diagram illustrating an outline of a flow of each data used in the news report support system of the first embodiment.

The following describes the functions of the above-mentioned component blocks of the news report support system 61 along with the flow of data in the news report support system 61 shown in FIG. 9.

Description of Data Flow in News Report Support System 61

FIG. 9 shows an outline of a flow of each data used in the news report support system 61.

In FIG. 9, each arrow indicated by alternate long and short dashed lines is indicative of a flow of news gathering metadata. Each arrow indicated by dashed lines is indicative of a flow of news gathering material. Each arrow indicated by double lines is indicative of a flow of program metadata. Each arrow indicated by a solid line is indicative of a flow of data of OA material.

Exemplary Structure of Data of News Report Support System 61

Figure 10:
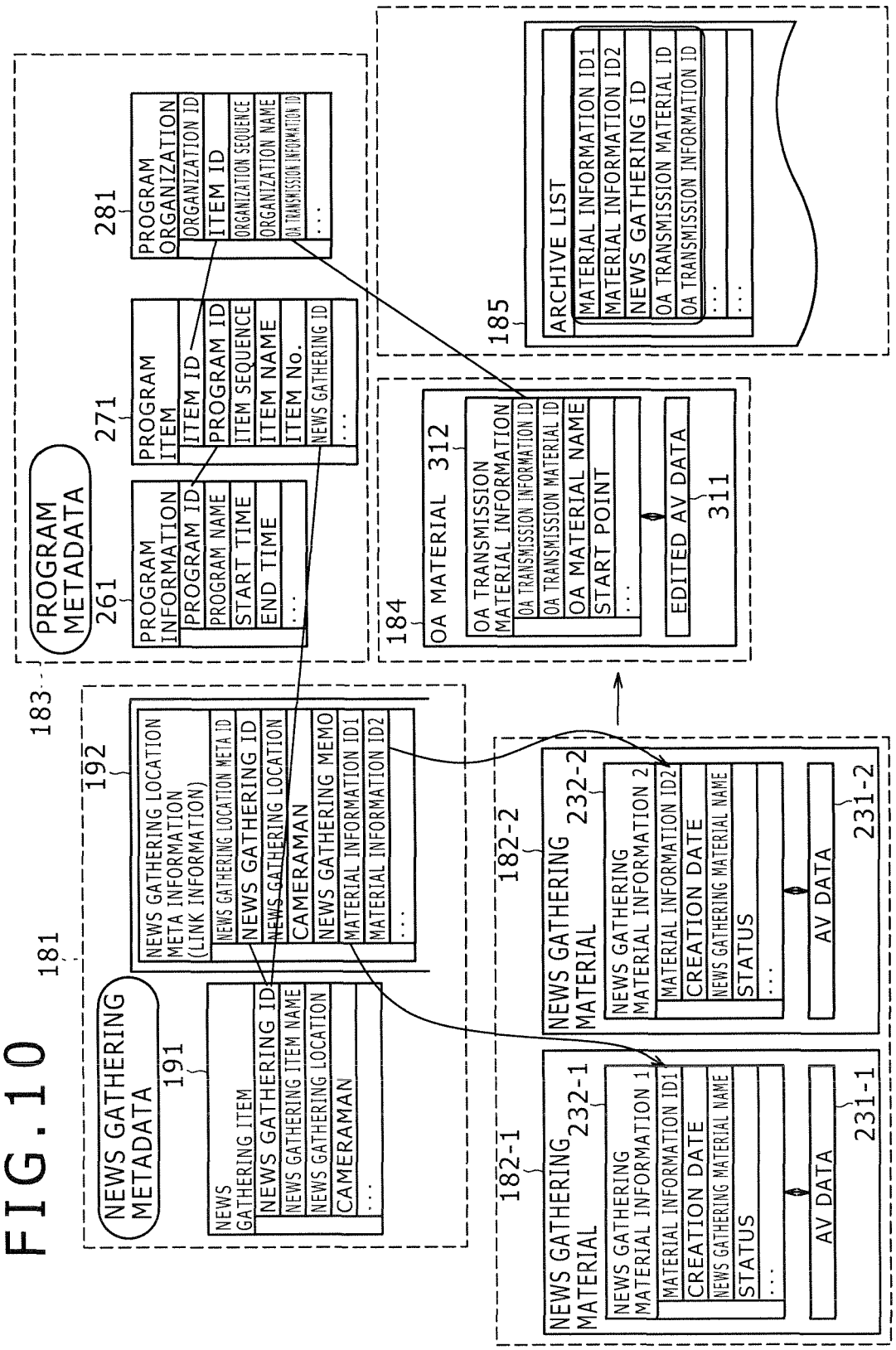
FIG. 10 is a diagram illustrating an exemplary structure of each data used in the news report support system of the first embodiment.

FIG. 10 shows an exemplary structure of each data used in the news report support system 61, namely, each data of which flow is shown in FIG. 9.

As shown in FIG. 10, in the first embodiment, a news gathering item 191 is arranged as one of news gathering metadata 181. The news gathering item 191 is a list containing various kinds of information associated with news gathering, such as news gathering item name, news gathering location, and cameraman, in addition to the news gathering ID permitting the unique identification of the news gathering item 191 concerned. The news report department 71 determines each element of the news gathering item 191 and enters the contents of the determined element into the news gathering item creation terminal 91. Then, on the basis of the contents entered from the news report department 71, the news gathering item creation block 121 of the news gathering item creation terminal 91 creates the data of the news gathering item 191.

The news gathering item transfer block 122 of the news gathering item creation terminal 91 transfers the created data of the news gathering item 191 to the field terminal 95 of the news gathering department 72 via the news report department LAN 94 and the external network 111 as shown in FIG. 9.

When the data of the news gathering item 191 comes from the news gathering item creation terminal 91, the link information creation block 131 of the field terminal 95 creates link information source data providing the source of the link information for relating the news gathering item 191 with the news gathering material.

The form of the link information is not especially limited. In the first embodiment, news gathering location meta information 192 as shown in FIG. 10 is employed as the link information. As shown in FIG. 10, the news gathering location meta information 192 is a list containing material information IDs for news gathering materials 182-1 through 182-*n* as elements in addition to the news gathering location meta ID permitting the unique identification of the news gathering location meta information 192 concerned and the elements of the news gathering item 191. In the first embodiment, the data obtained by the imaging by the imaging apparatus 96 during a period from a recording start instruction to a recording end instruction provides one subject of news gathering. Hence, for one news gathering item 191, n (n being any integer of one or more) news gathering materials 182-1 through 182-*n* are obtained. Therefore, two or more material information IDs are arranged for the news gathering materials 182-1 through 182-*n*. It should be noted that, in this stage, the news gathering materials 182-1 through 182-*n* have not been obtained, only a null item (namely, an area in which no data is stored) of material information ID is created. To be more specific, the news gathering location meta information 192 with the item of material information ID being null (namely, an area in which no data is stored) provides link information source data. Therefore, details being described later, when the material information ID included in each of the news gathering materials 182-1 through 182-*n* is stored (or registered) in the null item (namely, an area in which no data is stored) with a subject of news gathering being imaged by the imaging apparatus 96 and the news gathering materials 182-1 through 182-*n* obtained as a result, the data of link information is completed. It should be noted that, in what follows, n=2 for the convenience of description. Namely, as shown in FIG. 10, the number of news gathering materials to be obtained by the imaging apparatus 96 is two, the news gathering materials 182-1 and 182-2.

The link information creation block 131 of the field terminal 95 creates the above-mentioned link information source data, namely, the data of the news gathering location meta information 192 having a null item (namely, an area in which no data is stored) for the material information ID in the first embodiment, and transmits the created link information source data to the imaging apparatus 96.

Receiving the link information source data, the news gathering execution block 132 executes news gathering in accordance with an instruction (namely, an operation by the cameraman) of the news gathering department 72 at the news gathering location. To be more specific, the news gathering execution block 132 images the subject of news gathering and records the news gathering materials 182-1 and 182-2 obtained as a result to the removable recording media 97.

The news gathering material 182-K (K being 1 or 2) is made up of AV data 231-K and news gathering material information 232-K. The AV data 231-K is real data of video and audio about the subject of news gathering. The news gathering material information 232-K is a list containing various elements associated with the news gathering material 182-K concerned. In the first embodiment, as shown in FIG. 10, the news gathering material information 232-K includes creation date, news gathering material name, and status as elements in addition to the material information ID permitting the unique identification of the news gathering material 182-K concerned.

The news gathering material registration block 133 of the imaging apparatus 96 stores (or registers) the material information ID1 and the material information ID2 for the news gathering material 182-1 and the news gathering material 182-2, respectively, into the null item (namely, an area in which no data is stored) of the news gathering location meta information 192. Consequently, the link information, namely, the news gathering location meta information 192 is completed.

The elements of the news gathering item 191 includes a news gathering ID. Therefore, the news gathering location meta information 192 includes the news gathering ID for the news gathering item 191, and the material information ID1 and the material information ID2 for the news gathering material 182-1 and the news gathering material 182-2, respectively, thereby relating the news gathering item 191 with the news gathering material 182-1 and the news gathering material 182-2. Also, from a different viewpoint, because the news gathering location meta information 192 includes each element of the news gathering item 191, news gathering location meta information 192 can be seen as one of the news gathering metadata 181.

Creating the link information described above, namely, the news gathering location meta information 192 in the first embodiment, the news gathering material registration block 133 of the imaging apparatus 96 transfers the data of the link information (namely, the news gathering location meta information 192) to the recording apparatus 93 of the news report department 71 via the external network 111 and the news report department LAN 94.

The link information recording block 123 of the recording apparatus 93 receives the link information (namely, the news gathering location meta information 192) and records the received link information to the recording apparatus 93.

When the link information (namely, the news gathering location meta information 192) has been recorded as described above, namely, when the information necessary for the creation of a news report program has been obtained, the news report department 71 creates the program contents of the news report program concerned.

To be more specific, the news report department 71 creates the information that permits the identification of the news report program concerned. This information includes an ID (hereafter referred to as a program ID) permitting the unique identification of the news report program concerned, the name of the news report program concerned (hereafter referred to as a program name), a broadcasting time zone (indicated by start time and end time in the first embodiment) of the news report program concerned, for example. A list containing these various kinds of information for identifying each news report program as elements is hereafter referred to as program information. In the first embodiment, the news report department 71 creates program information 261 as shown in FIG. 10, for example.

To be more specific, the news report department 71 determines each element of the program information 261 and enters the element contents into the program item creation terminal 92. Then, the program item creation block 124 of the program item creation terminal 92 creates the data of the program information 261 on the basis of the element contents entered by the news report department 71.

Next, the news report department 71 determines m (m being an integer of 1 or higher) news gathering contents to be included in the news report program concerned and determines how the determined news gathering contents are to be broadcast, a broadcasting sequence for example. It should be noted that a list containing, as elements, various kinds of information for determining how to broadcast one piece of news gathering content is called a program item. In the first embodiment, the news report department 71 creates m program items 271 belonging to the program information 261 for example. It should be noted that, for the convenience of description, the following describes only one program item 271 corresponding to the news gathering contents identified by the news gathering item 191 shown in FIG. 10 among m pieces of program information. Namely, the program item 271 shown in FIG. 10 corresponds to the news gathering item 191 shown in FIG. 10. In other words, FIG. 10 shows only one program item 271 for the convenience of description; actually there are m program items 271.

The elements of the program item 271 include an item ID, a program ID, an item sequence, an item name, an item No., and a news gathering ID. The item ID can uniquely identify the program item 271 concerned. The program ID is the program ID of the program information 261 to which the program item 271 concerned belongs. Namely, the program ID relates the program information 261 with the program item 271 (namely, these items are linked to each other). The item sequence is a broadcasting sequence of the news gathering contents corresponding to the program item 271 concerned. The item name is the name of the program item 271 concerned. The item No. is the number attached to the program item 271 concerned. The news gathering ID is the news gathering ID of the news gathering item 191 about the news gathering contents corresponding to the program item 271 concerned. Namely, the news gathering ID relates the program item 271 with the news gathering item 191 corresponding thereto (namely, these items are linked to each other).

The news report department 71 determines these elements of the program item 271 and enters the contents of the determined elements into the program item creation terminal 92. Then, the program item creation block 124 of the program item creation terminal 92 creates the data of the program item 271 on the basis of the contents entered from the news report department 71.

It should be noted that, in the example shown in FIG. 10, in the news gathering executed in accordance with the news gathering item 191 corresponding to the program item 271, two news gathering materials 182-1 and 182-2 are obtained. It should be noted that the materials to be broadcast in the news report program are not the news gathering materials 182-1 and 182-2 themselves but the OA material obtained by the editing processing by the editing department 73. Details being described later, one OA material 184 is obtained as a result of the editing of the two news gathering materials 182-1 and 182-2 in the example shown in FIG. 10. Therefore, in the example shown in FIG. 10, the subject to be broadcast in accordance with the program item 271 is one OA material 184.

Further, in broadcasting the OA material 184 in accordance with the program item 271, the news report department 71 determines how to broadcast the OA material 184. A list containing, as elements, various kinds of information for determining how to broadcast the OA material 184 is referred to as a program organization. In the example shown in FIG. 10, the news report department 71 creates a program organization 281 associated with the OA material 184 for the program item 271.

The elements of the program organization 281 associated with the OA material 184 include an organization ID, an item ID, an organization sequence, an organization name, and an OA transmission information ID. The organization ID is an ID for uniquely identifying the program organization 281 concerned. The item ID is an item ID of the program item 271 to which the program organization 281 concerned belongs. Namely, the item ID relates the program item 271 with the program organization 281 (namely, these items are linked to each other). The organization sequence is a broadcasting sequence of the program organization 281 concerned. To be more specific, in the example shown in FIG. 10, one program organization 281 exists for the program item 271 for the convenience of description; however, there may be two or more program organizations 281 and broadcasting sequence of which provides an organization sequence. The organization name is the name of the program organization 281 concerned. The OA transmission information ID is an ID to be uniquely attached to the OA material to be broadcast in accordance with the program organization 281 concerned. The OA transmission information ID is also attached to the corresponding OA material 184. Namely, the OA transmission information ID relates the program organization 281 with the OA material 184 corresponding thereto (namely, these elements are linked to each other).

It should be noted that, in the first embodiment, at the stage where the program organization 281 described above has been created, the corresponding OA material 184 may not have been created. Namely, in this stage, the news report department 71 even determines to broadcast, in accordance with the program organization 281, the OA material 184 that might have been obtained if the already obtained news gathering material 182 had been edited. Hence, of the program organization 281, the program item creation block 124 creates only a null item (namely, an area in which no data is stored) in which the OA transmission information ID can be stored, not storing (namely, registering) an actual value. To be more specific, details being described later, at the stage where the OA material 184 scheduled for broadcasting in accordance with the program organization 281 has been stored in the OA server 101 of the transmission department 74, the OA transmission information ID included in the OA material 184 concerned is stored (namely, registered) in the null item (namely, an area in which no data is stored) of the program organization 281.

As described above, the program information 261 is created as the program contents of a news report program, thereby creating the program item 271 that belongs to the program information 261. Then, the program organization 281 is created for the program item 271. The data made up of these various kinds of information associated with the program contents of a news report program is referred to as program metadata 183. The program item creation block 124 transfers the program metadata 183 created as described above to the OA server management terminal 100 of the transmission department 74 via the news report department LAN 94.

Thus, while the program metadata 183 is created in the news report department 71, a news gathering material is edited in the editing department 73 to create an OA material.

To be more specific, the news gathering department 72 takes the removable recording media 97 recorded with the news gathering material from the imaging apparatus 96 and hands out the removable recording media 97 to the editing department 73. The editing department 73 loads this removable recording media 97 on the editing terminal 98 and executes a predetermined operation, an editing start instruction operation for example, on the editing terminal 98.

Then, the news gathering material acquisition block 141 of the editing terminal 98 reads the news gathering material from the loaded removable recording media 97 to get the news gathering material concerned. The news gathering material acquisition block 141 records the obtained news gathering material to the material server 99.

As instructed by the editing department 73, the editing block 142 of the editing terminal 98 edits the news gathering material so as to provide the data suitable for broadcasting, thereby creating an OA material.

To be more specific, in the example shown in FIG. 10, two news gathering materials 182-1 and 182-2 are created for one news gathering item 191, for example. Hence, each of the two news gathering materials 182-1 and 182-2 is edited, thereby creating one OA material 184.

The OA material 184 is made up of edited AV data 311 and OA transmission material information 312. The edited AV data 311 includes the real video and audio data obtained as a result of editing the AV data 231-1 and 231-2 of the news gathering materials 182-1 and 182-2. The OA transmission material information 312 is a list containing various elements associated with the OA material 184 concerned. In the first embodiment, as shown in FIG. 10, the OA transmission material information 312 includes an OA transmission material ID, an OA material name, and a start point as elements for uniquely identifying the OA material 184 concerned in addition to an OA transmission information ID for linking to the program organization 281 described above.

The OA material transfer block 143 of the editing terminal 98 transfers the above-mentioned OA material 184 to the OA server 101 of the transmission department 74.

Then, receiving the OA material 184, the OA material registration block 151 of the OA server management terminal 100 records the received OA material 184 to the OA server 101. In addition, the OA server management terminal 100 registers the OA material 184 to the program metadata 183 as a material scheduled for the broadcasting of the a news report program. To be more specific, as described above, in the first embodiment, the program contents of each news report program are managed by the program metadata 183. This program metadata 183 is arranged with the program item 271 as the metadata for managing the broadcast contents in a unit of news gathering item 191. In addition, for the program item 271, the program organization 281 is arranged as the metadata for managing the broadcast contents in a unit of OA material. Therefore, the OA material registration block 151 registers the OA material 184 to the program organization 281 corresponding to the OA material 184. Namely, as described above, the OA material registration block 151 stores (namely, registers) the OA transmission information ID of the OA material 184 to the program organization 281.

Consequently, the program metadata 183 of a news report program has been completed. The OA material registration block 151 records the completed program metadata 183 to the recording apparatus 93 of the news report department 71. At this point of time, the link information (namely, the news gathering location meta information 192) and the program metadata 183 are recorded to the recording apparatus 93.

The program broadcasting block 152 of the broadcasting apparatus 102 builds an OTC system and, when the broadcasting date and time of the news report program come, broadcasts this news report program in accordance with the program metadata 183.

For the news report program broadcast (or scheduled to be broadcast) by the program broadcasting block 152, the archive list creation block 153 creates data of an archive list on the basis of the information recorded to the recording apparatus 93 and the OA material 184 recorded to the OA server 101.

Namely, as shown in FIG. 10, at this point of time, the OA material 184 is related with the news gathering materials 182-1 and 182-2 in a sequence of the OA material 184, the program metadata 183, the news gathering metadata 181, and the news gathering materials 182-1 and 182-2.

To be more specific, the OA material 184 can be identified by the OA transmission material ID included in the OA transmission material information 312. The OA transmission material information 312 includes the OA transmission information ID. The OA transmission information ID is included in the program organization 281 of the program metadata 183. Thus, the OA material 184 is related with the program metadata 183 by the OA transmission material ID and the OA transmission information ID.

Further, in the program metadata 183, the program organization 281 concerned is related with the program item 271 by the item ID. This program item 271 includes the news gathering ID. This news gathering ID is an ID for identifying the corresponding news gathering item 191 and is also included in the news gathering location meta information 192. Thus, by the news gathering ID, the program metadata 183 related with the OA material 184 is related with the news gathering item 191 and the news gathering location meta information 192.

The news gathering location meta information 192 including the news gathering ID includes the material information ID1 and the material information ID2 for identifying the news gathering materials 182-1 and 182-2, respectively.

Thus, the OA material 184 is related with the news gathering materials 182-1 and 182-2 by the OA transmission material ID, the OA transmission information ID, the news gathering ID, and the material information ID1 and ID2. Therefore, in the example shown in FIG. 10, a list containing, as elements, the OA transmission material ID, the OA transmission information ID, the news gathering ID, and the material information ID1 and ID2 is created as an archive list 185. It should be noted that the elements contained in the archive list 185 may be arranged in any sequence; in the example shown in FIG. 10, the elements are listed in a sequence different from that mentioned above.

The data of the archive list 185 mentioned above is transferred from the archive list creation block 153 to the archive management terminal 103 via the OA server 101, the archive apparatus 104, and the archive department LAN 105, for example.

Then, the OA material transfer block 161 of the archive management terminal 103 transfers the OA material 184 from the OA server 101 to the archive apparatus 104 in accordance with the archive list 185.

In addition, the news gathering material transfer block 162 of the archive management terminal 103 transfers the news gathering materials 182-1 and 182-2 from the material server 99 to the archive apparatus 104 in accordance with the archive list 185.

the archive execution block 163 of the archive apparatus 104 executes archiving. Namely, the archive execution block 163 relates the OA material 184 with the news gathering materials 182-1 and 182-2 and stores the related materials into a hard disk or the like in the archive apparatus 104.

As a result, the search block 164 of the archive management terminal 103 can easily search from one to another between the OA material 184 and the news gathering materials 182-1 and 182-2.

The restore block 165 of the archive apparatus 104 restores the OA material 184 to the material server 99 of the editing department 73. Consequently, the editing department 73 can edit the OA material 184. Namely, because the OA material 184 is a material created as a result of the editing of the news gathering materials 182-1 and 182-2 once, the editing department 73 can re-edit the news gathering materials 182-1 and 182-2.

Figure 11:
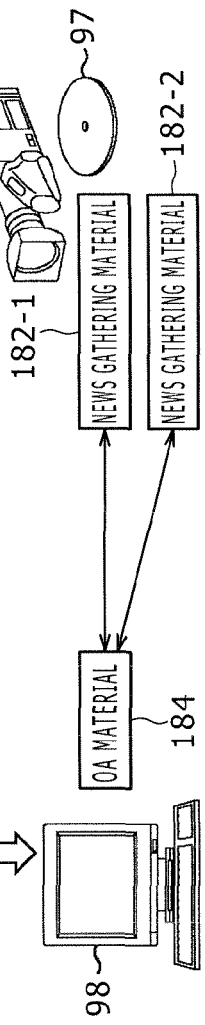
FIG. 11 is a diagram illustrating a manner in which data are related with each other in the news report support system of the first embodiment.

A manner in which each data is related with others that are used in the news report support system 61 as described above will be described below with reference to specific examples.
Program Item Table FIG. 11 shows a manner in which the data that are used in the news report support system 61 are related with each other.

First, the news gathering item creation block 121 of the news gathering item creation terminal 91 of the news report department 71 creates data of the news gathering item 191 and transfers the created data to the news gathering department 72. In the example shown in FIG. 11, the elements of the news gathering item 191 include news gathering item name ("High school soccer final match"), news gathering date ("12/28"), news gathering location ("Kokuritsu"), reporter ("Imai"), and cameraman ("Suzuki"). It should be noted that the news gathering ID is "1" for convenience. It should also be noted that the elements included in the news gathering item 191 shown in FIG. 11 are one example of the news gathering item 191 and different from the elements shown in FIG. 10.

Receiving the data of the news gathering item 191, the link information creation block 131 of the field terminal 95 creates link information source data on the basis of the received data and transmits the created link information source data to the imaging apparatus 96.

Receiving the link information source data, the news gathering execution block 132 of the imaging apparatus 96 executes news gathering and records the news gathering materials 182-1 and 182-2 obtained as a result to the removable recording media 97. On the basis of the link information source data, the news gathering material registration block 133 of the imaging apparatus 96 creates data of the link information (corresponding to the news gathering location meta information 192 shown in FIG. 10) for relating the news gathering item 191 with the news gathering materials 182-1 and 182-2 and transfers the created data to the news report department 71.

Receiving the data of link information, the program item creation block 124 of the program item creation terminal 92 of the news report department 71 creates a program item table 331. The program item table 331 is one example of the program metadata 183 shown in FIG. 10 and a list containing the program information 261, the program item 271, and the program organization 281. It should be noted that the elements included in the program information 261, the program item 271, and the program organization 281 shown in FIG. 11 are only examples of the program information 261, the program item 271, and the program organization 281 shown in FIG. 10 and are different from the elements shown in FIG. 10.

As shown in FIG. 11, the program information 261 indicative of program name and so on is shown in an upper part of the program item table 331. In FIG. 11, the program item 271 indicated by a solid-line arrow and the program organization 281 indicated by a dashed-line arrow correspond to the news gathering item 191 whose news gathering ID is "1." Therefore, in what follows, the program item 271 and the program organization 281 are used in the following description, for example.

The elements of the program information 261 include a program name ("Evening news") by which a predetermined news report program is identified and a start time and an end time ("17:00:00-17:15:00").

The elements of the program item 271 include item No. "3," start time "17:03:00," scheduled length "01:00," item name "High school soccer final match Relay: Kokuritsu Arena, Live coverage: Sasaki announcer." Here, "item No." that is an element of the program item 271 shown in FIG. 11 corresponds to "item ID" that is an element of the program item 271 shown in FIG. 10.

Then, the program item 271 is related with the program organization 281 whose organization numbers are "1" and "2."

For example, the elements of the program organization 281 whose organization number is "2" include organization No. "2," contents "Relay: Kokuritsu Arena, Live coverage: Sasaki announcer," organization time "01:00," and material "V2." Here, "material" that is an element of the program organization 281 shown in FIG. 11 corresponds to "OA transmission information ID" that is an element of the program organization 281 shown in FIG. 10. "OA transmission information ID" is an ID that is uniquely assigned to the OA material to be broadcast in accordance with the program organization 281 and is also assigned to the corresponding OA material 184.

The program item 271 is related with the news gathering item 191 by "1" that is the news gathering ID. Namely, the program item 271 and the news gathering item 191 are related with each other by "1" that is the news gathering ID, so that the program item 271 includes "High school soccer final match" that is a part of the contents of the elements of the news gathering item 191.

In addition, the program item 271 and the program organization 281 are related with each other by "3" that is the item ID (item No.). Namely, the program item 271 and the program organization 281 are related with each other by the item ID, so that the program organization 281 includes "Relay: Kokuritsu Arena, Live coverage: Sasaki announcer" that is a part of the contents of the elements of the program item 271.

Further, as shown in FIG. 11, the program organization 281 is related with the OA material 184 obtained as a result of editing the news gathering materials 182-1 and 182-2 by "V2" that is the OA transmission information ID (material).

As described above, in the sequence of the news gathering materials 182-1 and 182-2, link information, the program metadata 183 (namely, the program item table 331), and the OA material 184, the news gathering materials 182-1 and 182-2 are related with the OA material 184.

The following describes a flow of the processing to be executed by the news report support system 61 with reference to FIG. 12 through FIG. 15.

Processing by News Report Support System 61

Figure 12:
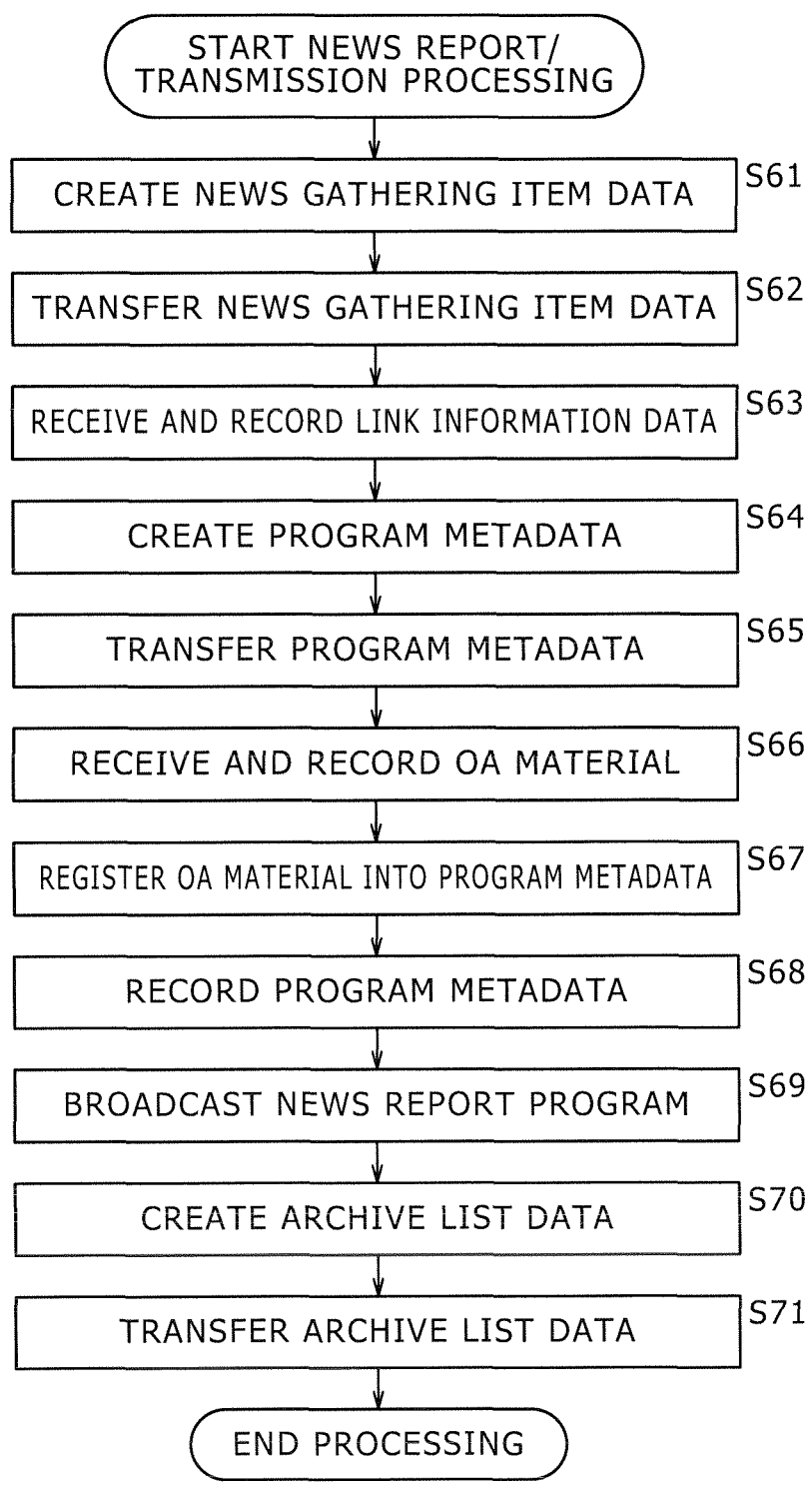
FIG. 12 is a flowchart indicative of a flow of news report/transmission processing of the news report support system of the first embodiment.
Figure 13:
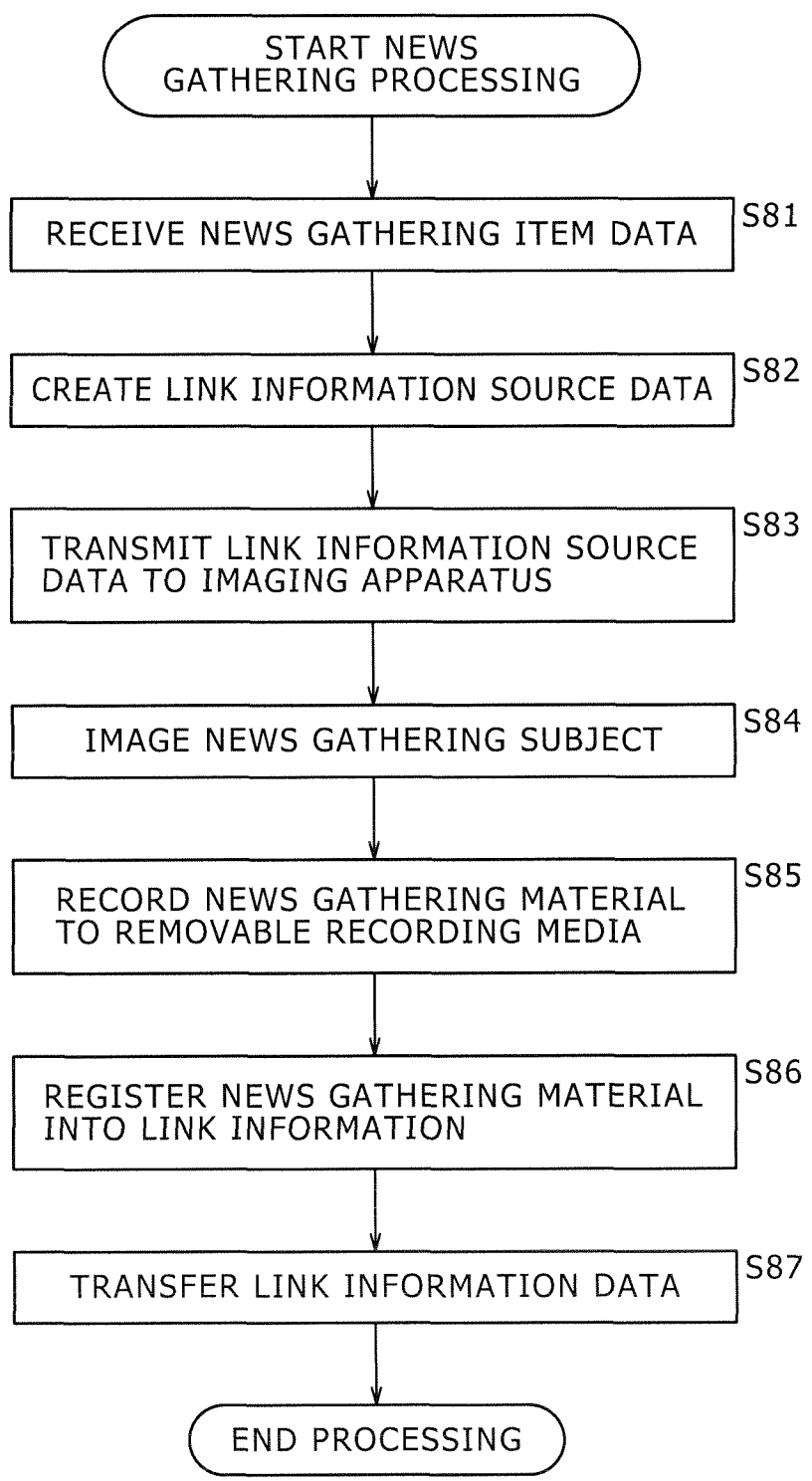
FIG. 13 is a flowchart indicative of a flow of news gathering processing in the news report support system of the first embodiment.
Figure 14:
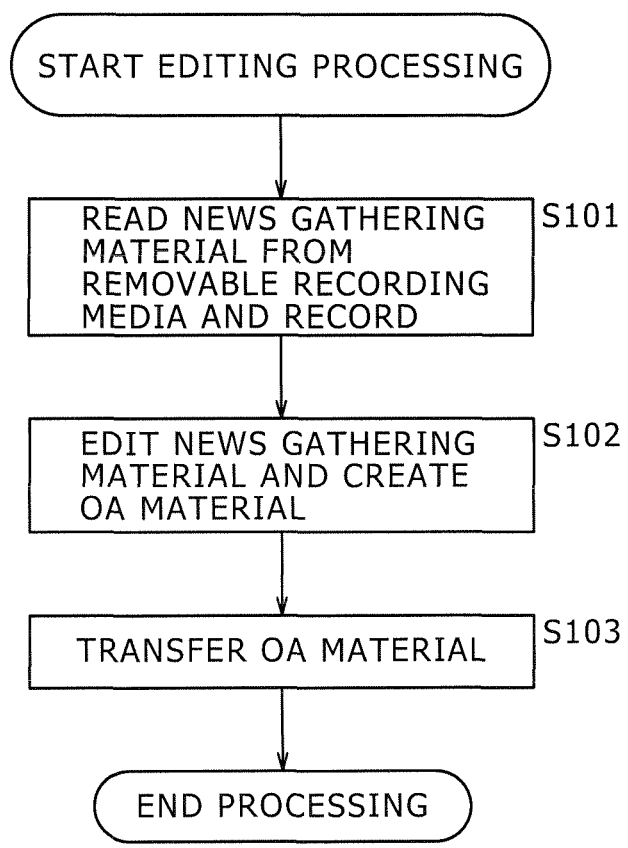
FIG. 14 is a flowchart indicative of a flow of editing processing in the news report support system of the first embodiment.
Figure 15:
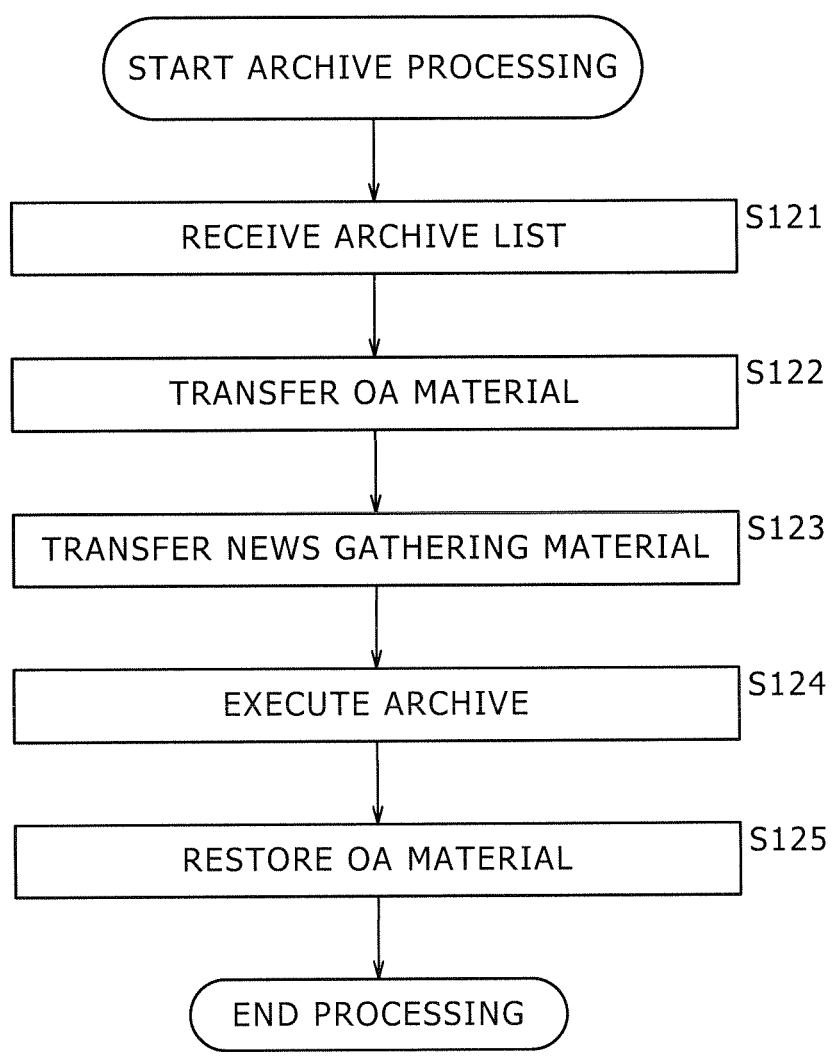
FIG. 15 is a flowchart indicative of a flow of archive processing in the news report support system of the first embodiment.

FIG. 12 is a flowchart indicative of news report/transmission processing. FIG. 13 is a flowchart indicative of news gathering processing. FIG. 14 is a flowchart indicative of editing processing. FIG. 15 is a flowchart indicative of archiving processing.

In step S61 shown in FIG. 12, the news gathering item creation block 121 of the net gathering item creation terminal 91 of the news report department 71 creates data of the news gathering item 191 on the basis of the contents entered from the news report department 71. The news gathering item 191 includes a news gathering ID for uniquely identifying the news gathering item 191 concerned.

In step S62, the news gathering item transfer block 122 transfers the data of the news gathering item 191 to the field terminal 95 of the news gathering department 72. The processing operations of steps S63 and on will be described later.

In step S81 shown in FIG. 13, the link information creation block 131 of the field terminal 95 receives the data of the news gathering item 191 transferred from the news gathering item transfer block 122 of the news gathering item creation terminal 91 of the news report department 71.

In step S82, the link information creation block 131 creates link information source data. To be more specific, the link information creation block 131 creates data of the news gathering location meta information 192 with the item of the material information ID being a null item (namely, an area in which no data is stored) as link information source data. It should be noted that the news gathering location meta information 192 includes a null item (namely, an area in which no data is stored) of the material information ID for the news gathering ID and the news gathering materials 182-1 and 182-2.

In step S83, the link information creation block 131 transmits the created link information source data to the imaging apparatus 96.

In step S84, the news gathering execution block 132 of the imaging apparatus 96 images the subject of news gathering. Namely, receiving the link information source data, the news gathering execution block 132 images the subject of news gathering at the news gathering location in accordance with an instruction of the news gathering department 72 (namely, an operation of the cameraman).

In step S85, the news gathering execution block 132 records the news gathering materials 182-1 and 182-2 obtained for one news gathering item 191 to the removable recording media 97. It should be noted that news gathering material 182-K is made up of AV data 231-K that are real data of video and audio of the subject of news gathering and news gathering material information 232-K. The news gathering material information 232-K includes the material information ID for uniquely identifying the news gathering material 182-K concerned.

In step S86, the news gathering material registration block 133 of the imaging apparatus 96 registers the news gathering material into the link information. Namely, the news gathering material registration block 133 stores (or registers) the material information ID1 and material information ID2 of the news gathering materials 182-1 and 182-2 into the null item (namely, an area in which no data is stored) of the news gathering location meta information 192, thereby completing the data of the link information. It should be noted that the news gathering location meta information 192 includes the material information ID1 and material information ID2 of the news gathering materials 182-1 and 182-2 in addition to the news gathering ID, thereby relating the news gathering item 191 with the news gathering materials 182-1 and 182-2.

In step S87, the news gathering material registration block 133 transfers the data of link information, namely, the news gathering location meta information 192, to the recording apparatus 93 of the news report department 71.

Here, the news gathering processing has been completed.

In step S63 shown in FIG. 12, the link information recording block 123 of the recording apparatus 93 receives the data of link information transferred from the news gathering material registration block 133 in step S87 shown in FIG. 13, namely, the news gathering location meta information 192, and records the received news gathering location meta information 192 into the recording apparatus 93.

In step S64, the program item creation block 124 of the program item creation terminal 92 creates the program metadata 183. Namely, the program item creation block 124 creates the program information 261 and the program item 271 that belongs to the program information 261 concerned. Then, the program item creation block 124 creates the program organization 281 for the program item 271 concerned.

The program information 261 includes a program ID for uniquely identifying a news report program. The program item 271 includes an item ID, a program ID, and a news gathering ID. Therefore, by the program ID, the program information 261 is related (namely, linked) with the program item 271. The program organization 281 includes an item ID, an organization ID and an OA transmission information ID. Therefore, by the item ID, the program item 271 is related (namely, linked) with the program organization 281. Further, the program item 271 includes a news gathering ID which is also included in the news gathering item 191 and the news gathering location meta information 192. Therefore, by the news gathering ID, the program metadata 183 is related (namely, linked) with the news gathering item 191 and the news gathering location meta information 192.

In step S65, the program item creation block 124 transfers the program metadata 183 to the OA server management terminal 100 of the transmission department 74. The processing operations of steps S66 and on will be described later.

Thus, while the program metadata 183 is created in the news report department 71, the news gathering material is edited into an OA material in the editing department 73.

When the news gathering processing shown in FIG. 13 has been completed, the news gathering department 72 takes the removable recording media 97 recoding the news gathering materials 182-1 and 182-2 out of the imaging apparatus 96 and sends the removable recording media 97 to the editing department 73. The editing department 73 loads this removable recording media 97 into the editing terminal 98 and executes a predetermined operation, an instruction for starting an editing operation for example, on the editing terminal 98. Then, the editing processing shown in FIG. 14 starts.

In step S101 shown in FIG. 14, the news gathering material acquisition block 141 of the editing terminal 98 reads the news gathering materials 182-1 and 182-2 from the removable recording media 97 and records the obtained news gathering materials 182-1 and 182-2 to the material server 99.

In step S102, the editing block 142 edits the news gathering materials 182-1 and 182-2 to create the OA material 184. Namely, the editing block 142 edits the news gathering materials 182-1 and 182-2 obtained for one news gathering item 191 to resultantly create the OA material 184. It should be noted that the OA material 184 is made up of the edited AV data 311 that are the real data of video and audio obtained as a result of the editing of the AV data 231-K of the news gathering material 182-K and the OA transmission material information 312. In addition to an OA transmission information ID for linking the program organization 281 created by the program item creation block 124, the OA transmission material information 312 includes an OA transmission material ID for uniquely identifying the OA material 184 concerned.

In step S103, the OA material transfer block 143 transfers the OA material 184 to the transmission department 74.

Thus, the editing processing has been completed.

In step S66 shown in FIG. 12, the OA material registration block 151 of the OA server management terminal 100 receives the OA material 184 transferred from the OA material transfer block 143 of the editing terminal 98 of the editing department 73 and records the received OA material 184 to the OA server 101.

In step S67, the OA material registration block 151 registers the OA material into the program metadata 183. Namely, the OA material registration block 151 stores (or registers) the OA transmission information ID of the OA material 184 into the program organization 281 of the program metadata 183. Consequently by the OA transmission information ID, the OA material 184 is related (or linked) with the program organization 281.

In step S68, the OA material registration block 151 records the program metadata 183 with the OA transmission information ID of the OA material 184 stored (or registered) to the recording apparatus 93 of the news report department 71.

In step S69, the program broadcasting block 152 of the broadcasting apparatus 102 broadcasts a news report program. Namely, the program broadcasting block 152 builds an OTC system and, when the broadcasting date and time of a news report program come, broadcasts the news report program concerned in accordance with the program metadata 183 concerned.

In step S70, for the news report program broadcast by the program broadcasting block 152, the archive list creation block 153 of the OA server management terminal 100 creates data of the archive list 185 on the basis of the information recorded to the recording apparatus 93 and the OA material 184 recorded to the OA server 101. The archive list 185 includes elements such as an OA transmission material ID, an OA transmission information ID, a news gathering ID, and a material information ID. By these elements of the archive list 185, the OA material 184 is related with the news gathering materials 182-1 and 182-2. To be more specific, by the OA transmission material ID and the OA transmission information ID, the OA material 184 is related with the program metadata 183. By the news gathering ID, the program metadata 183 related with the OA material 184 is related with the news gathering item 191 and the news gathering location meta information 192. Further, the news gathering location meta information 192 including this news gathering ID includes the material information ID1 and the material information ID2 for identifying the news gathering materials 182-1 and 182-2, respectively. Consequently, by the above-mentioned elements contained in the archive list 185, the OA material 184 is related with the news gathering materials 182-1 and 182-2.

In step S71, the archive list creation block 153 transfers the data of the archive list 185 to the archive management terminal 103 of the archive department 75.

Thus, the news report/transmission processing has been completed.

In step S121 shown in FIG. 15, the OA material transfer block 161 and the news gathering material transfer block 162 of the archive department 75 receive the archive list 185 transferred from the archive list creation block 153 of the OA server management terminal 100 of the transmission department 74.

In step S122, the OA material transfer block 161 transfers the OA material 184 from the OA server 101 to the archive apparatus 104 in accordance with the archive list 185.

In step S123, the news gathering material transfer block 162 transfers the news gathering materials 182-1 and 182-2 from the material server 99 to the archive apparatus 104 in accordance with the archive list 185.

In step S124, the archive execution block 163 of the archive apparatus 104 executes archive processing. To be more specific, the archive execution block 163 relates the OA material 184 with the news gathering materials 182-1 and 182-2 and stores the related materials on a hard disk drive for example in the archive apparatus 104. Consequently, the search block 164 of the archive management terminal 103 can easily execute a search operation from one to the other of the OA material 184 and the news gathering materials 182-1 and 182-2.

In step S125, the restore block 165 restores the OA material 184 to the material server 99 of the editing department 73. Consequently, the editing department 73 can re-edit the news gathering materials 182-1 and 182-2.

Thus, the archive processing has been completed.

As described above, by the OA transmission material ID, the OA transmission information ID, the news gathering ID, and the material information ID1 and ID2, the OA material 184 is related with the news gathering materials 182-1 and 182-2 in a sequence of the program metadata 183, the news gathering metadata 181, and the news gathering materials 182-1 and 182-2. Consequently, searching processing can be easily executed from one to the other of the OA material 184 and the news gathering materials 182-1 and 182-2.

(2) Second Embodiment

It should be noted that, in the news report support system 61 practiced as the first embodiment described above, the data of link information for relating the news gathering item 191 created in the news report department 71 with the news gathering materials 182-1 and 182-2 obtained in the news gathering department 72 is transferred from the imaging apparatus 96 to the news report department 71 via the external network 111. However, the imaging apparatus 96 may not be connected to the external network 111 due to security problems of the system or performance problems of the imaging apparatus 96. The second embodiment of the present disclosure is intended to secure the relation between news gathering materials before editing and the OA materials after editing if the above-mentioned disconnection occurs.

Figure 16:
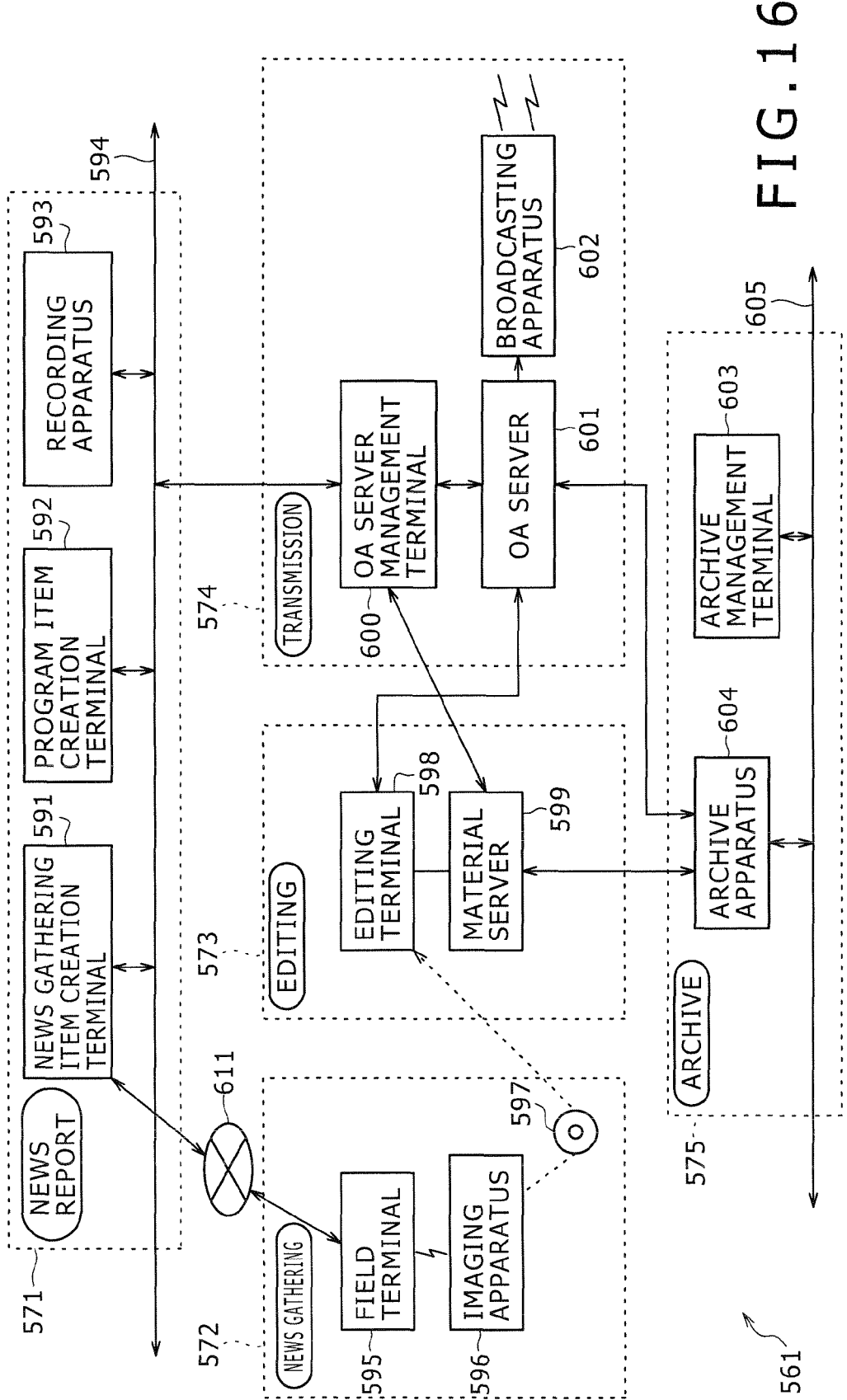
FIG. 16 is a block diagram illustrating an exemplary configuration of a news report support system practiced as a second embodiment of the disclosure.

Exemplary Configuration of News Report Support System Practiced as Second Embodiment Now, referring to FIG. 16, there is shown a block diagram illustrating an exemplary configuration of a news report support system practiced as the second embodiment of the disclosure.

As shown in FIG. 16, a news report support system 561 practiced as the second embodiment is made up of apparatuses used in a news report department 571, a news gathering department 572, an editing department 573, a transmission department 574, and an archive department 575.

It should be noted that the jobs of the news report department 571, the news gathering department 572, the editing department 573, the transmission department 574, and the archive department 575 are actually executed by human beings by use of the apparatuses arranged in these departments. For the convenience of description, it is assumed that each of these jobs is executed by the department concerned rather than the human being concerned.

The basic configurations of a news gathering item creation terminal 591, a program item creation terminal 592, a recording apparatus 593, and a news report department LAN 594 arranged in the news report department 571 shown in FIG. 16 are substantially the same as the basic configurations of the news gathering item creation terminal 91, the program item creation terminal 92, the recording apparatus 93, and the news report department LAN 94 arranged in the news report department 71 shown in FIG. 3. The basic configurations of an archive management terminal 603, an archive apparatus 604, and an archive department LAN 605 arranged in the archive department 575 shown in FIG. 16 are substantially the same as the basic configurations of the archive management terminal 103, the archive apparatus 104, and the archive department LAN 105 arranged in the archive department 75 shown in FIG. 3. Consequently, in what follows, in the news report support system 561 shown in FIG. 16, the description of the above-mentioned substantially the same configurations will be skipped and only different points will be described. Namely, the following describes only the configurations of the news gathering department 572, the editing department 573, and the transmission department 574.

The news gathering department 572 executes news gathering in accordance with the contents of news gathering created by the news report department 571. In order to execute this news gathering, the news gathering department 572 has the field terminal 595 and an imaging apparatus 596. To be more specific, the field terminal 595 and the imaging apparatus 596 are portable and can be connected to the external network 611 to communicate other devices connected thereto. In addition, the field terminal 595 and the imaging apparatus 596 can wirelessly communicate with each other by use of infrared communication. Detail being described later, the field terminal 595 receives news gathering metadata transferred from the news gathering item creation terminal 591 via the external network 611 at a news gathering location in the second embodiment, for example. Then, by use of the received news gathering metadata, the field terminal 595 creates link information source data and wirelessly transmits the created data to the imaging apparatus 596. In accordance with the received link information source data, the imaging apparatus 596 images the subject of news gathering at the news gathering location and records the imaged data to a removable recording media 597 as a news gathering material. In addition, the imaging apparatus 596 creates link information from the link information source data and transfers the created link information to a removable recording media 597 as one of news gathering metadata.

On the other hand, the removable recording media 597 to which the news gathering material and the link information are recorded is sent from the news gathering department 572 to the editing department 573. The editing department 573 edits the news gathering material recorded to the removable recording media 597 to create an OA material. In order to achieve this editing processing, the editing department 573 has the an editing terminal 598 and a material server 599. The editing terminal 598 is directly connected to the material server 599 and an OA server 601 of the transmission department 574 with a cable or the like. Details being descried later, both the news gathering material and the link information are obtained by the material server 599 to be recorded in the second embodiment, for example. Then, the news gathering material recorded to the material server 599 is edited by the editing terminal 598 to provide an OA material. The editing terminal 598 creates an OA material including elements for relating program contents created by the news report department 571 with the OA material and transfers the created OA material to the OA server 601 of the transmission department 574. The link information recorded to the material server 599 is transferred to the OA server management terminal 600 on demand from an OA server management terminal 600 to be described later.

By use of the OA material created by the editing department 573, the transmission department 574 broadcasts a news report program. In order to achieve this broadcasting, the transmission department 574 has the OA server management terminal 600, the OA server 601, and a broadcasting apparatus 602. The OA server management terminal 600 is interconnected to each apparatus arranged in the news report department 571 by the news report department LAN 594. The OA server management terminal 600 is also directly connected to the OA server 601 and the material server 599 of the editing department 573 with a cable or the like. The OA server 601 is directly connected to a broadcasting apparatus 602, the editing terminal 598 of the editing department 573, and the archive apparatus 604 of the archive department 575 with a cable for example. The broadcasting apparatus 602 builds an OTC system. Details being described later, the OA server management terminal 600 monitors the recorded contents of the material server 599 of the editing department 573 in the second embodiment, for example. To be more specific, if contents stored in the material server 599 are changed, that is, if a news gathering material and link information are newly recorded from the removable recording media 597, the data of the link information is obtained from the material server 599 to be transferred to the recording apparatus 593 of the news report department 571. In addition, the OA server management terminal 600 creates an archive list containing, as elements, various kinds of information for relating an OA material with a news gathering material that is the OA material before being edited and transfers the created archive list to the archive management terminal 603 of the archive department 575.

The following describes an exemplary functional configuration of the news report support system 561 described above with reference to FIG. 17 through FIG. 21.

Exemplary Functional Configuration of News Report Support System 561

FIG. 17 through FIG. 21 are block diagrams illustrating the functional configurations of the above-mentioned departments making up the news report support system 561.

Figure 17:
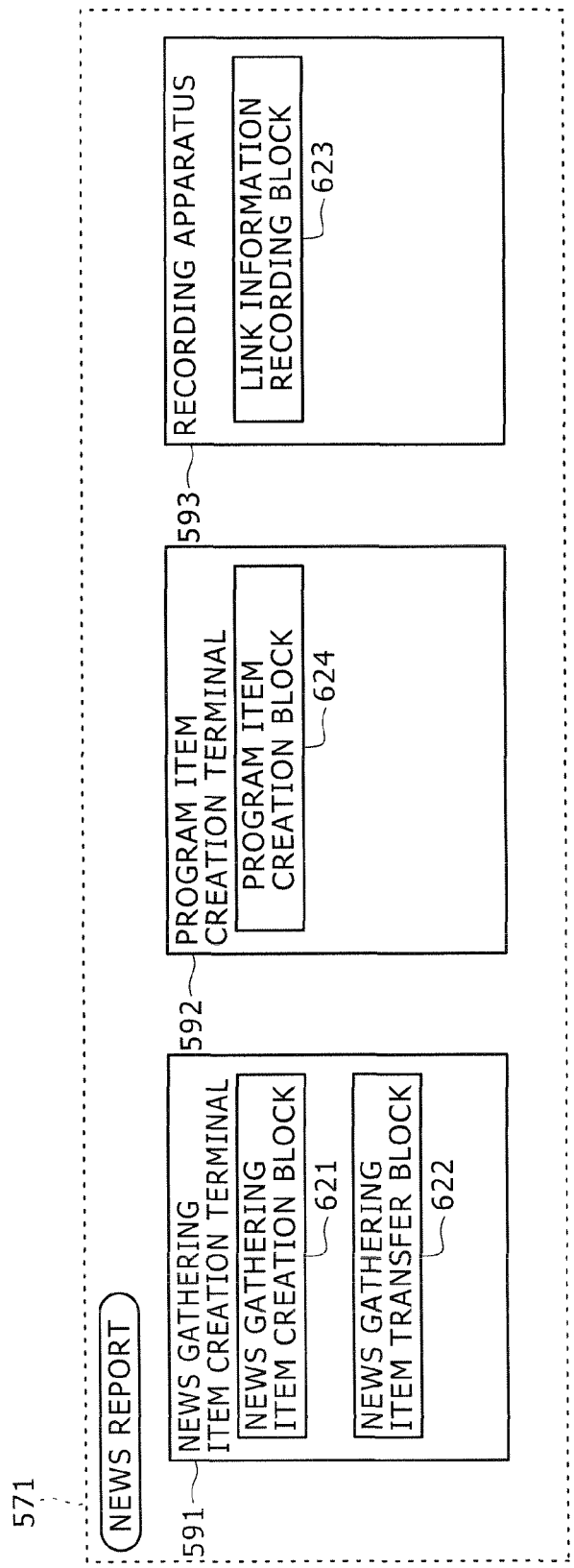
FIG. 17 is a block diagram illustrating an exemplary functional configuration of a news report department of the news report support system of the second embodiment.

FIG. 17 is a block diagram illustrating an exemplary functional configuration of the news report department 571.

The news gathering item creation terminal 591 has a news gathering item creation block 621 and a news gathering item transfer block 622. The program item creation terminal 592 has a program item creation block 624. The recording apparatus 593 has a link information recording block 623.

Figure 18:
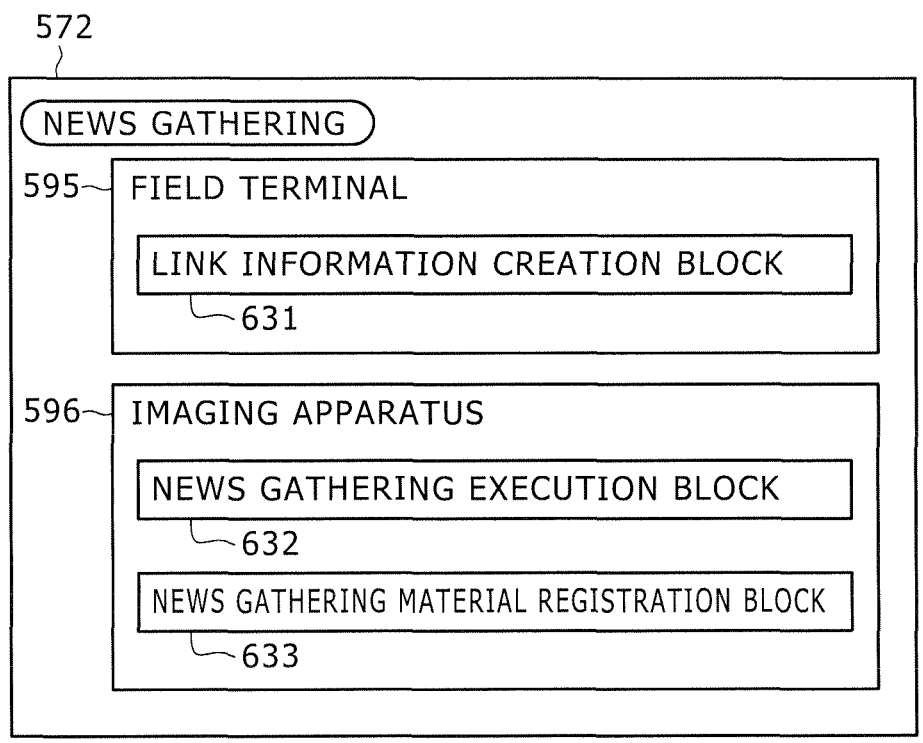
FIG. 18 is a block diagram illustrating an exemplary functional configuration of a news gathering department of the news report support system of the second embodiment.

FIG. 18 is a block diagram illustrating an exemplary functional configuration of the news gathering department 572.

The field terminal 595 has a link information creation block 631. The imaging apparatus 596 has a news gathering execution block 632 and a news gathering material registration block 633.

Figure 19:
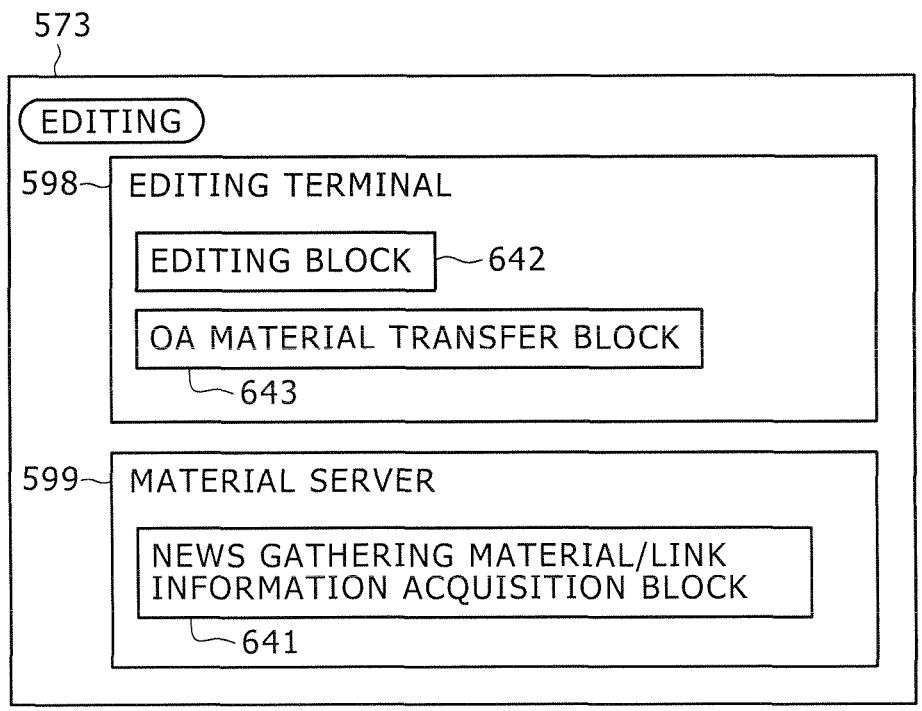
FIG. 19 is a block diagram illustrating an exemplary functional configuration of an editing department of the news report support system of the second embodiment.

FIG. 19 is a block diagram illustrating an exemplary functional configuration of the editing department 573.

The editing terminal 598 has an editing block 642 and an OA material transfer block 643. The material server 599 has a news gathering material/link information acquisition block 641.

Figure 20:
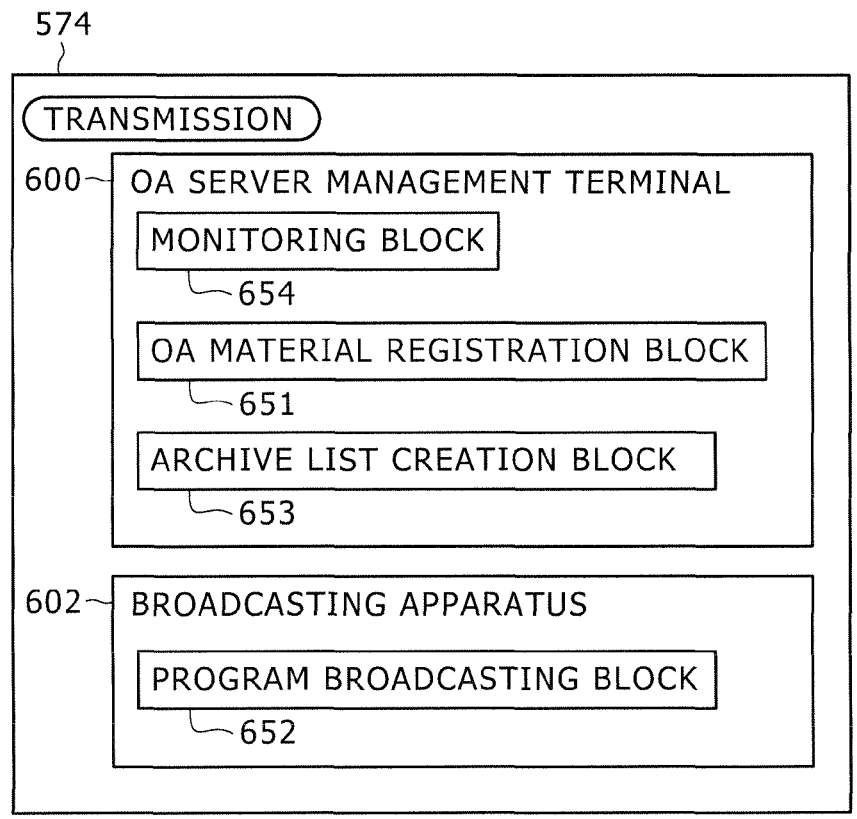
FIG. 20 is a block diagram illustrating an exemplary functional configuration of a transmission department of the news report support system of the second embodiment.

FIG. 20 is a block diagram illustrating an exemplary functional configuration of the transmission department 574.

The OA server management terminal 600 has an OA material registration block 651, an archive list creation block 653, and a monitoring block 654. The broadcasting apparatus 602 has a program broadcasting block 652.

Figure 21:
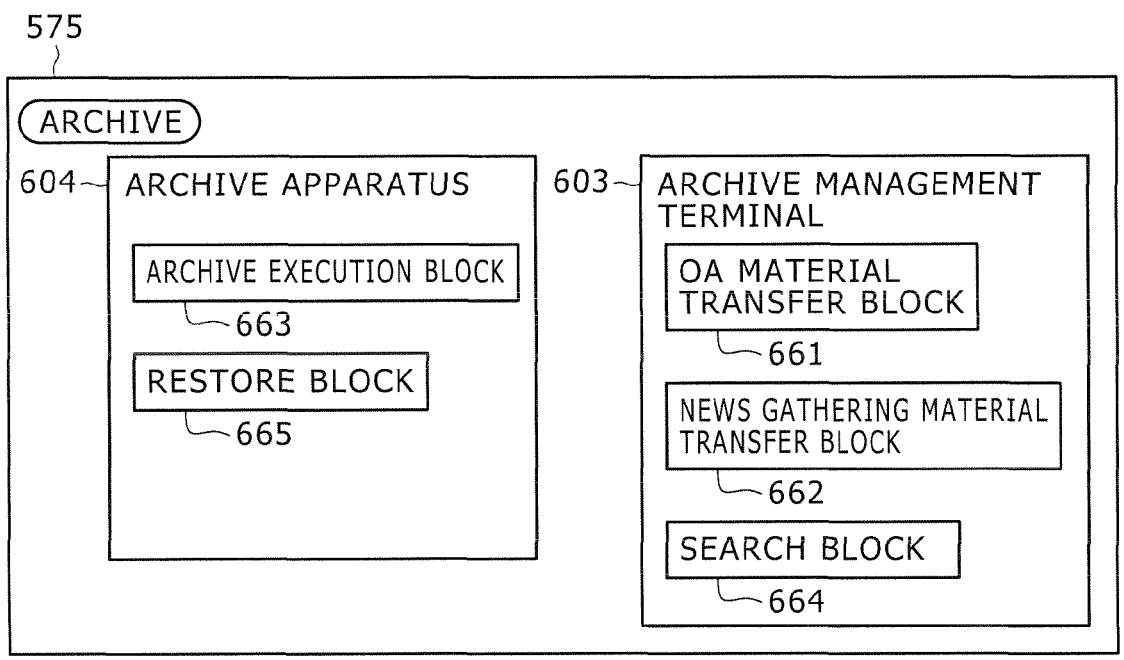
FIG. 21 is a block diagram illustrating an exemplary functional configuration of an archive department of the news report support system of the second embodiment.

FIG. 21 is a block diagram illustrating an exemplary functional configuration of the archive department 575.

The archive management terminal 603 has an OA material transfer block 661, a news gathering material transfer block 662, and a search block 664. The archive apparatus 604 has an archive execution block 663 and a restore block 665.

Figure 22:
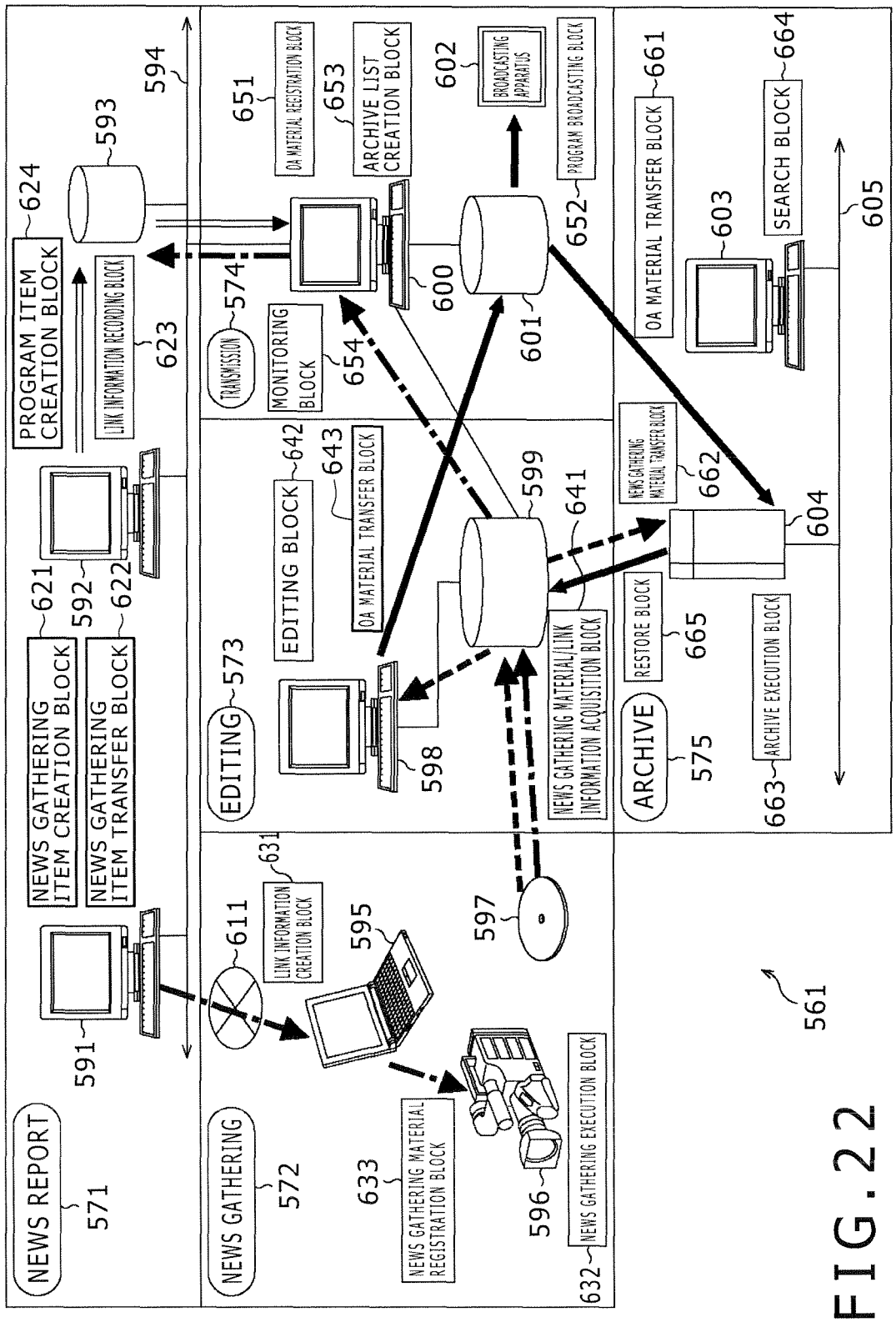
FIG. 22 is a diagram illustrating an outline of a flow of each data used in the news report support system of the second embodiment.

The following describes the functions of the component blocks of the news report support system 561 with data flows in the news report support system 561 shown in FIG. 22.

Description of Data of News Report Support System 561

FIG. 22 shows an outline of the flows of data used in the news report support system 561.

In FIG. 22, each arrow indicated by alternate long and short dashed lines is indicative of a flow of news gathering metadata. Each arrow indicated by dashed lines is indicative of a flow of news gathering material. Each arrow indicated by double lines is indicative of a flow of program metadata. Each arrow indicated by a solid line is indicative of a flow of data of OA material.

It should be noted that an exemplary structure of each data used in the news report support system 561, namely, each data of which flow is shown in FIG. 22, is substantially the same as the exemplary structure of each data shown in FIG. 10. Therefore, the description of the exemplary structure of each data used in the news report support system 561 is skipped.

The news report department 571 determines each element of the news gathering item 191 and enters the determined element into the news gathering item creation terminal 591. Then, as shown in FIG. 22, the news gathering item creation block 621 of the news gathering item creation terminal 591 creates the data of the news gathering item 191 in accordance with the contents entered from the news report department 571.

The news gathering item transfer block 622 of the news gathering item creation terminal 591 transfers the data of the news gathering item 191 to the field terminal 595 of the news gathering department 572 via the news report department LAN 594 and the external network 611.

If the data of the news gathering item 191 comes from the news gathering item creation terminal 591, the link information creation block 631 of the field terminal 595 creates link information source data that provides the link information for relating the news gathering item 191 with a news gathering material. Although there is no special form for the link information, the news gathering location meta information 192 shown in FIG. 10 is employed for the link information in the second embodiment.

The link information creation block 631 of the field terminal 595 creates the above-mentioned link information source data, namely the data of the news gathering location meta information 192 having a null item (namely, an area in which no data is stored) in the items of material information ID in the second embodiment, and transmits the created data to the imaging apparatus 596.

Receiving the link information source data, the news gathering execution block 632 of the imaging apparatus 596 executes news gathering at the news gathering location in accordance with an instruction (namely, an operation by the cameraman) of the news gathering department 572. To be more specific, the news gathering execution block 632 images the subject of news gathering and records news gathering materials 182-1 and 182-2 obtained as a result to the removable recording media 597.

The news gathering material registration block 633 of the imaging apparatus 596 stores (namely, registers) material information ID1 and material information ID2 of the news gathering materials 182-1 and 182-2, respectively, into the null item (namely, an area in which no data is stored) of the news gathering location meta information 192. Consequently, the link information, namely, the news gathering location meta information 192 is completed.

It should be noted that the elements of the news gathering item 191 include a news gathering ID. Therefore, the news gathering location meta information 192 includes the news gathering ID for the news gathering item 191, and the material information ID1 and the material information ID2 for the news gathering material 182-1 and the news gathering material 182-2, respectively, thereby relating the news gathering item 191 with the news gathering materials 182-1 and 182-2. Also, from a different viewpoint, because the news gathering location meta information 192 includes each element of the news gathering item 191, news gathering location meta information 192 can be seen as one of the news gathering metadata 181.

Creating the above-mentioned link information, namely, the news gathering location meta information 192 in the second embodiment, the news gathering material registration block 633 of the imaging apparatus 596 records the created link information to the removable recording media 597 along with the news gathering materials 182-1 and 182-2.

The news gathering department 572 removes the removable recording media 597 recording the news gathering material and the link information from the imaging apparatus 596 and hands out the removed recording media to the editing department 573. The editing department 573 loads this removable recording media 597 on the material server 599 and executes a predetermined operation, an edit start instructing operation for example, on the material server 599.

Then, the news gathering material/link information acquisition block 641 of the material server 599 reads the news gathering material and the link information from the loaded removable recording media 597 to get the news gathering material concerned and the link information concerned and records the obtained news gathering material and link information.

It should be noted that the OA server management terminal 600 of the transmission department 574 is monitoring the recorded contents of the material server 599. If a change occurs in the recorded contents of the material server 599, namely, if a news gathering material and link information are newly recorded from the removable recording media 597 to the material server 599, then the OA server management terminal 600 gets the data of the link information from the material server 599 and transfers the obtained data of the link information to the recording apparatus 593 of the news report department 571.

Receiving the link information (namely, the news gathering location meta information 192), the link information recording block 623 of the recording apparatus 593 records the received link information to the recording apparatus 593.

When the link information (namely, the news gathering location meta information 192) has been recorded as described above, namely, the information necessary for the creation of a news report program has been obtained, the news report department 571 creates the program contents of the news report program concerned.

To be more specific, first, the news report department 571 creates the program information 261 that can identify the news report program concerned. Namely, the news report department 571 determines each element of the program information 261 and enters the contents of the determination into the program item creation terminal 592. Then, the program item creation block 624 of the program item creation terminal 592 creates the program information 261 on the basis of the contents entered from the news report department 571.

Next, the news report department 571 creates the program item 271 that belongs to the program information 261. By the program ID included in the program item 271, the program information 261 is related (or linked) with the program item 271. By the news gathering ID included in the program item 271, the program item 271 is related (or linked) with the news gathering item 191 corresponding to the program item 271.

The news report department 571 determines each element of the program item 271 and enters the contents of the determination into the program item creation terminal 592. Then, the program item creation block 624 of the program item creation terminal 592 creates the data of the program item 271 on the basis of the contents entered from the news report department 571.

In the example shown in FIG. 10, two news gathering materials 182-1 and 182-2 are obtained in the news gathering executed in accordance with the news gathering item 191 corresponding to the program item 271. However, a material to be broadcast in a news report program is not any of these two news gathering materials 182-1 and 182-2 themselves, but an OA material obtained by editing any of these materials by the editing department 73. In the example shown in FIG. 10, as a result of the editing of the two news gathering materials 182-1 and 182-2, one OA material 184 is obtained. Therefore, in the example shown in FIG. 10, the subject to be broadcast in accordance with the program item 271 is one OA material 184.

Further, in broadcasting the OA material 184 in accordance with the program item 271, the news report department 571 creates the data of program organization 281 for determining how to broadcast the OA material 184. In the example shown in FIG. 10, the news report department 71 creates the program organization 281 for the OA material 184 for the program item 271.

By the item ID included in the program organization 281, the program item 271 is related (or linked) with the program organization 281. By the OA transmission information ID included in the program organization 281, the program organization 281 is related (or linked) with the OA material 184 corresponding to the program organization 281.

It should be noted that, in the second embodiment, the corresponding OA material 184 has not sometimes been created at the stage where the program organization 281 described above is created. If this happens, the program item creation block 624 creates only a null item (namely, an area in which no data is stored) in which the OA transmission information ID can be stored of the program organization 281 and does not store (or register) an actual value. To be more specific, at the time the OA material 184 scheduled to be broadcast in accordance with the program organization 281 has been stored in the OA server 601 of the transmission department 574, the OA transmission information ID included in the OA material 184 concerned is stored (or registered) in the null item (namely, an area in which no data is stored) of the program organization 281.

As described above, the program information 261 is created as the program contents of a news report program and the program item 271 belonging to the program information 261 concerned is created. Then, for the program item 271 concerned, the program organization 281 is created. The program item creation block 624 transfers the program metadata 183 thus created to the OA server management terminal 600 of the transmission department 574 via the news report department LAN 594.

Thus, while the program metadata 183 is created in the news report department 571, the news gathering material is edited to create an OA material in the editing department 573.

As instructed by the editing department 573, the editing block 642 of the editing terminal 598 edits the news gathering material recorded to the material server 599 into the data suitable for broadcasting, thereby creating the OA material. To be more specific, each of the two news gathering materials 182-1 and 182-2 is edited to create one OA material 184 as a result.

The OA material transfer block 643 of the editing terminal 598 transfers the OA material 184 to the OA server 601 of the transmission department 574.

Then, an OA material registration block 651 of the OA server management terminal 600 registers the OA material 184 as the material scheduled for broadcasting of a news report program. Namely, the OA material registration block 651 stores (or registers) the OA transmission information ID of the OA material 184 into the program organization 281.

Consequently, the program metadata 183 of the news report program has been completed. Also, the OA material registration block 651 records the completed program metadata 183 to the recording apparatus 593 of the news report department 571. At this point of time, the link information (namely, the news gathering location meta information 192) and the program metadata 183 are recorded to the recording apparatus 593.

The program broadcasting block 652 of the broadcasting apparatus 602 builds an OTC system. When the broadcasting date and time of the news report program come, the program broadcasting block 652 broadcasts the news report program concerned in accordance with the program metadata 183.

For the news report program broadcast (or scheduled to be broadcast) by the program broadcasting block 652 as described above, the archive list creation block 653 creates the data of an archive list on the basis of the information recorded to the recording apparatus 593 and the OA material 184 recorded to the OA server 601.

To be more specific, as shown in FIG. 10, at this point of time, the OA material 184 is related with the news gathering materials 182-1 and 182-2 in a sequence of the OA material 184, the program metadata 183, the news gathering metadata 181, and the news gathering materials 182-1 and 182-2.

Hence, in the example shown in FIG. 10, a list containing, as elements, OA transmission material ID, OA transmission information ID, news gathering ID, and material information ID1 and material information ID2 is created as the archive list 185.

The above-mentioned data of the archive list 185 is transferred from the archive list creation block 653 to the archive management terminal 603 via the OA server 601, the archive apparatus 604, and the archive department LAN 605, for example.

Then, the OA material transfer block 661 of the archive management terminal 603 transfers the OA material 184 from the OA server 601 to the archive apparatus 604 in accordance with the archive list 185.

In addition, the news gathering material transfer block 662 of the archive management terminal 603 transfers the news gathering materials 182-1 and 182-2 from the material server 599 to the archive apparatus 604 in accordance with the archive list 185.

The archive execution block 663 of the archive apparatus 604 executes archive processing. Namely, the archive execution block 663 relates the OA material 184 with the news gathering materials 182-1 and 182-2 and stores the related materials into a hard disk drive for example in the archive apparatus 604.

As a result, the search block 664 of the archive management terminal 603 can easily execute a search operation from one to the other of the OA material 184 and the news gathering materials 182-1 and 182-2.

The restore block 665 of the archive apparatus 604 restores the OA material 184 to the material server 599 of the editing department 573. Consequently, the editing department 573 can edit the OA material 184. Namely, because the OA material 184 is a material created as a result of once editing the news gathering materials 182-1 and 182-2, the editing department 573 can re-edit the news gathering materials 182-1 and 182-2.

The following describes the flows of the processing to be executed by the news report support system 561 with reference to FIG. 23 through FIG. 26.

Processing of News Report Support System 561

Figure 23:
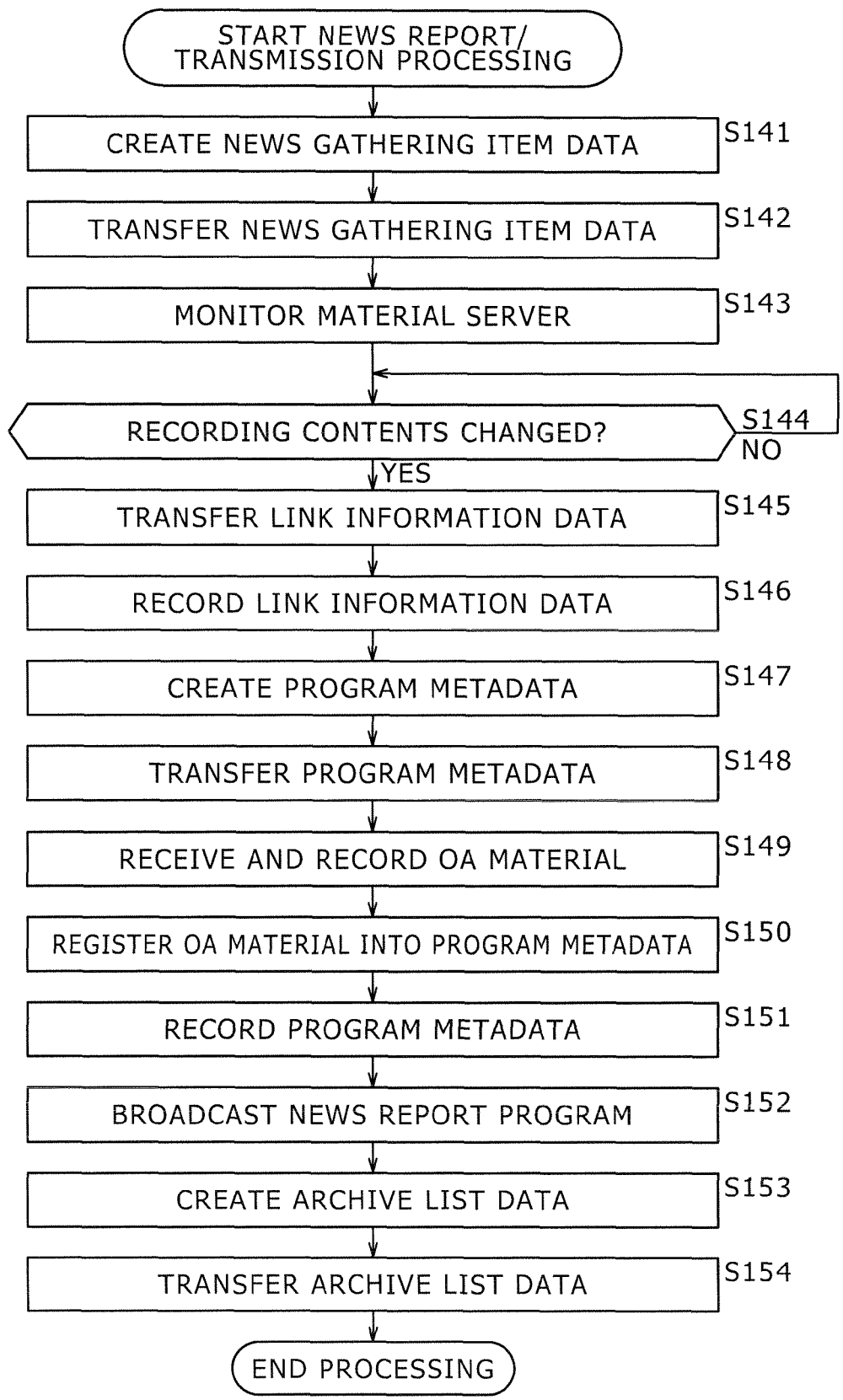
FIG. 23 is a flowchart indicative of a flow of news report/transmission processing of the news report support system of the second embodiment.
Figure 24:
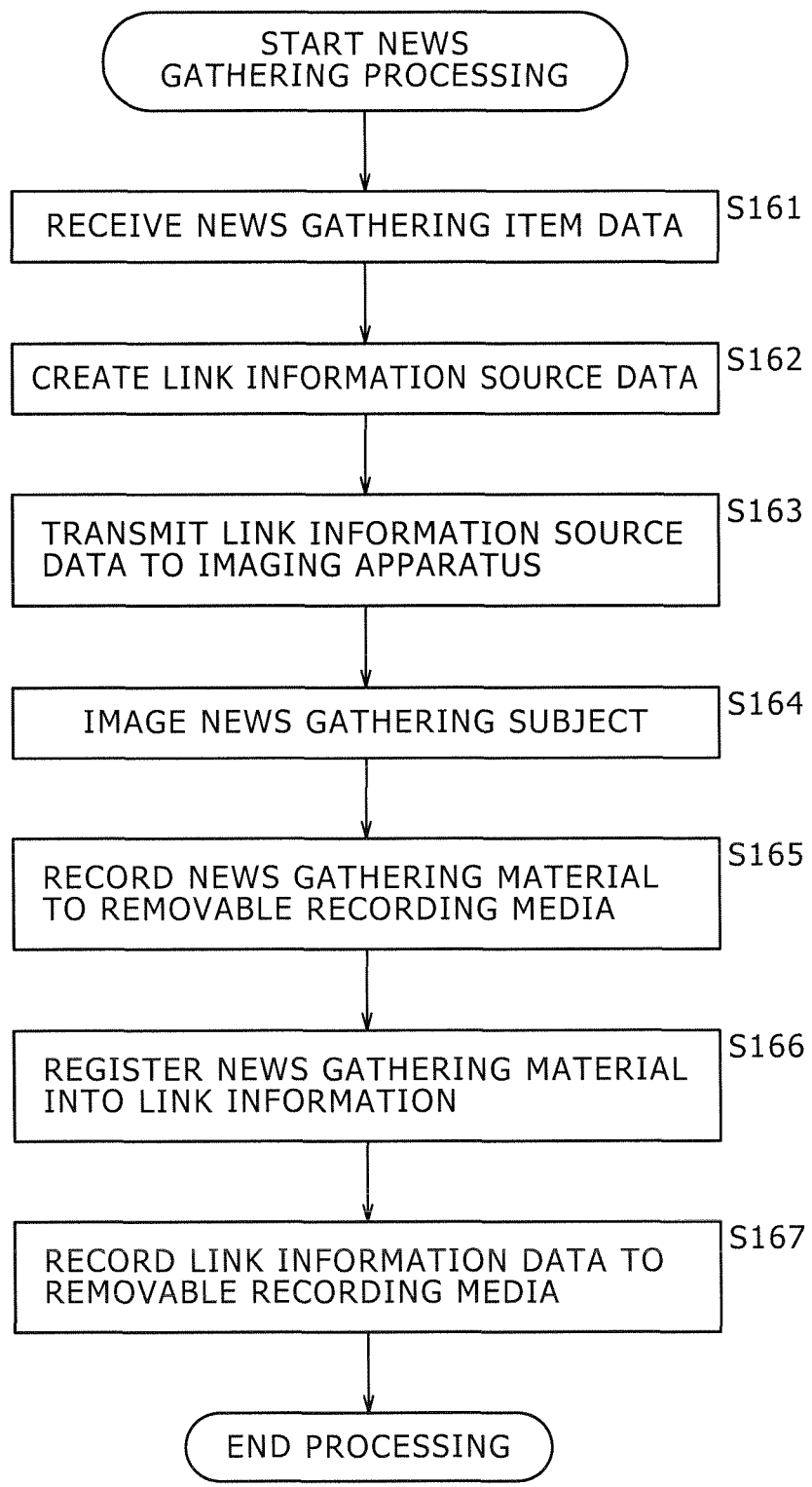
FIG. 24 is a flowchart indicative of a flow of news gathering processing in the news report support system of the second embodiment.
Figure 25:
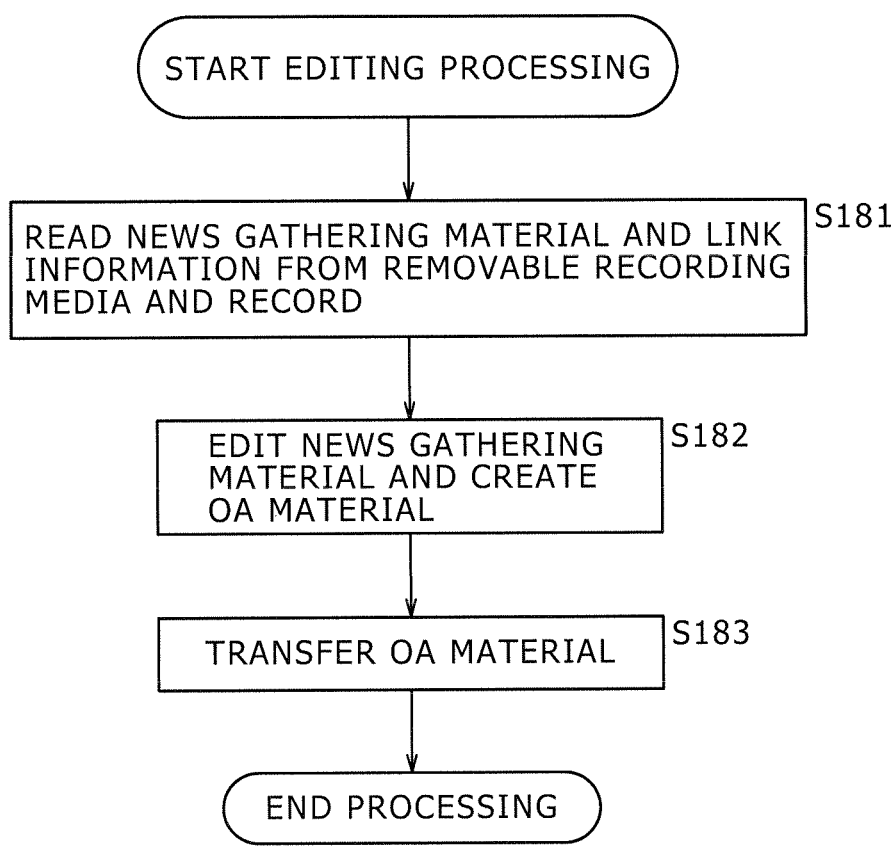
FIG. 25 is a flowchart indicative of a flow of editing processing in the news report support system of the second embodiment.
Figure 26:
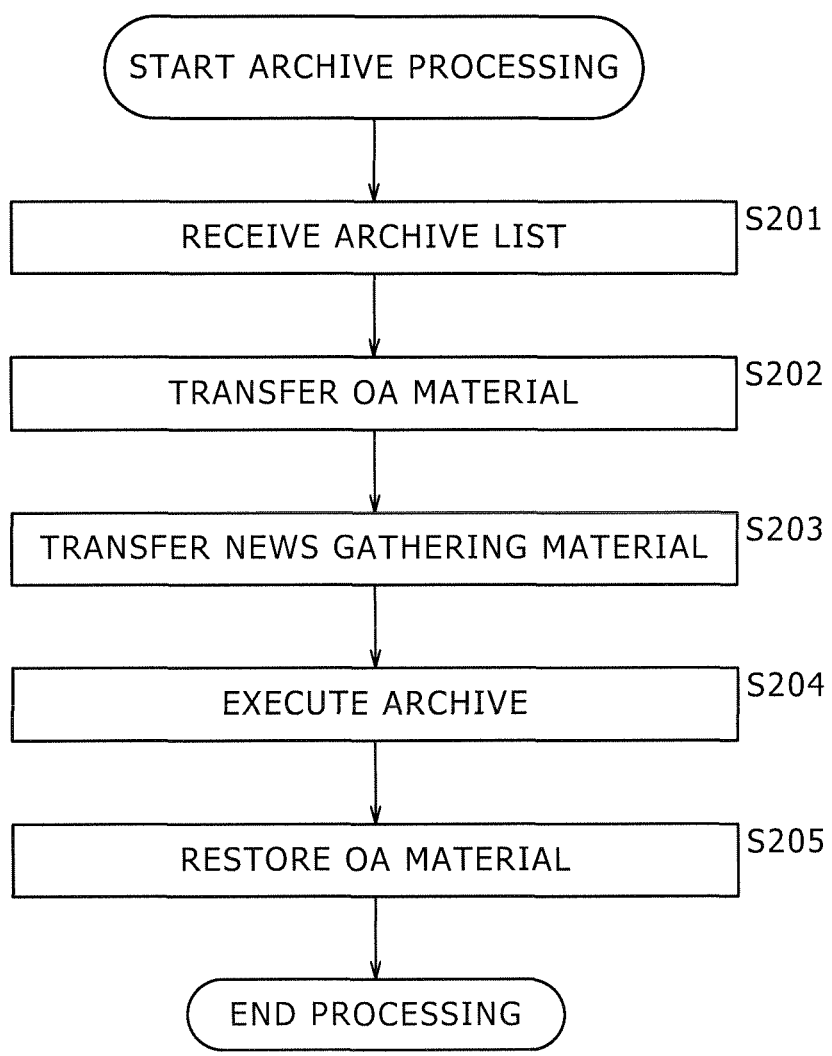
FIG. 26 is a flowchart indicative of a flow of archive processing in the news report support system of the second embodiment.

FIG. 23 is a flowchart indicative of a flow of news report/transmission processing. FIG. 24 is a flowchart indicative of a flow of news gathering processing. FIG. 25 is a flowchart indicative of a flow of editing processing. FIG. 26 is a flowchart indicative of a flow of archive processing.

In step S141 shown in FIG. 23, the news gathering item creation block 621 of the news gathering item creation terminal 591 of the news report department 571 creates data of the news gathering item 191 on the basis of the contents entered from the news report department 571. It should be noted that the news gathering item 191 includes a news gathering ID for uniquely identifying the news gathering item 191 concerned.

In step S142, the news gathering item transfer block 622 transfers the created data of the news gathering item 191 to the field terminal 595 of the news gathering department 572. The processing operations of steps S143 and on will be described later.

In step S161 shown in FIG. 24, the link information creation block 631 of the field terminal 595 receives the data of the news gathering item 191 coming from the news gathering item transfer block 622 of the news gathering item creation terminal 591 of the news report department 571.

In step S162, the link information creation block 631 creates link information source data. To be more specific, the link information creation block 631 creates data of the news gathering location meta information 192 with the item of a material information ID being a null item (namely, an area in which no data is stored). It should be noted that the news gathering location meta information 192 includes null items (namely, an area in which no data is stored) for news gathering ID and the material information ID for the news gathering materials 182-1 and 182-2.

In step S163, the link information creation block 631 transmits the created link information source data to the imaging apparatus 596.

In step S164, the news gathering execution block 632 of the imaging apparatus 596 images the subject of news gathering. To be more specific, upon receiving the link information source data, the news gathering execution block 632 images the subject of news gathering at the news gathering location in accordance with an instruction (namely, an operation of the cameraman) of the news gathering department 572.

In step S165, the news gathering execution block 632 records the news gathering materials 182-1 and 182-2 obtained for one news gathering item 191 to the removable recording media 597.

In step S166, the news gathering material registration block 633 of the imaging apparatus 596 registers the news gathering material to the link information. To be more specific, the news gathering material registration block 633 stores material information ID1 and material information ID2 of the news gathering materials 182-1 and 182-2, respectively, into (or registers) the null item (namely, an area in which no data is stored) of the news gathering location meta information 192, thereby completing the data of the link information. In addition to the news gathering ID, the news gathering location meta information 192 includes material information ID1 and material information ID2 for the news gathering materials 182-1 and 182-2, thereby relating the news gathering item 191 with the news gathering materials 182-1 and 182-2.

In step S167, the news gathering material registration block 633 records the data of the link information, namely, the news gathering location meta information 192, to the removable recording media 597 to which the news gathering materials 182-1 and 182-2 are recorded.

Thus, the news gathering processing has been completed.

When the news gathering processing shown in FIG. 24 has been completed, the news gathering department 572 removes the removable recording media 597 recording the news gathering material and the link information from the imaging apparatus 596 and sends the removable recording media 597 to the editing department 573. The editing department 573 loads the received removable recording media 597 onto the material server 599 and executes a predetermined operation, an edit start instructing operation for example, on the material server 599. Then, the edit processing shown in FIG. 25 starts.

In step S181 shown in FIG. 25, the news gathering material/link information acquisition block 641 of the material server 599 reads the news gathering material and the link information from the removable recording media 597 and records the obtained news gathering material and link information to the material server 599. The processing operations of steps S182 and on will be described later.

On the other hand, in the news report department 571, after the transfer processing of step S142 shown in FIG. 23, the monitoring block 654 of the OA server management terminal 600 of the transmission department 574 monitors the recorded contents of the material server 599 of the editing department 573 in step S143. To be more specific, the monitoring block 654 monitors the newly recording of the news gathering material and the link information to the material server 599.

In step S144, the monitoring block 654 determines whether there is a change in the recorded contents of the material server 599. To be more specific, the monitoring block 654 determines whether a news gathering material and link information have been newly recorded to the material server 599 as a result of the processing of step S181 shown in FIG. 25.

If no change is found in the recorded contents of the material server 599, then the decision is No in step S144, upon which the procedure is returned to step S144 to repeat the above-mentioned processing therefrom. Namely, until there is a change in the recorded contents of the material server 599, the decision processing of step S144 is repeated.

Then, if a change is found in the recorded contents of the material server 599, namely, if a news gathering material and link information have been newly recorded in step 181 shown in FIG. 25, then the decision in step S144 is Yes, upon which the procedure goes to step S145.

In step S145, the monitoring block 654 transfers the data of the link information, namely, the news gathering location meta information 192, to the material server 599.

In step S146, the link information recording block 623 of the recording apparatus 593 of the news report department 571 records the data of the link information, namely, the news gathering location meta information 192, from the material server 599 to the OA server management terminal 600.

In step S147, the program item creation block 624 of the program item creation terminal 592 creates program metadata 183. To be more specific, the program item creation block 624 creates the program information 261 and the program item 271 that belongs to the program information 261 concerned. Then, program item creation block 624 creates the program organization 281 for the program item 271 concerned. Then, by the program ID, the program information 261 is related (or linked) with the program item 271. In addition, by the program ID, the program information 261 is related (or linked) with the program item 271. Further, by the news gathering ID, the program metadata 183 is related (or linked) with the news gathering item 191 and the news gathering location meta information 192.

In step S148, the program item creation block 624 transfers the program metadata 183 to the OA server management terminal 600 of the transmission department 574. The processing operations of steps S149 and on will be described later.

Thus, while the program metadata 183 is created in the news report department 571, the news gathering material is edited to create an OA material in the editing department 573.

In the editing department 573, after the recording processing of step S181 shown in FIG. 25, the editing block 642 edits the news gathering materials 182-1 and 182-2 recorded to the material server 599 to create the OA material 184 in step S182. To be more specific, the editing block 642 edits the news gathering materials 182-1 and 182-2 obtained for one news gathering item 191 to create the OA material 184 as a result.

In step S183, the OA material transfer block 643 transfers the OA material 184 to the OA server 601 of the transmission department 574.

Thus, the edit processing has been completed.

In step S149 shown in FIG. 23, the OA material registration block 651 of the OA server management terminal 600 of the transmission department 574 receives the OA material 184 coming from the OA material transfer block 643 of the editing terminal 598 of the editing department 573 and records the received OA material 184 into the OA server 601.

In step S150, the OA material registration block 651 registers the OA material to the program metadata 183. To be more specific, the OA material registration block 651 stores (or registers) the OA transmission information ID of the OA material 184 into the program organization 281 of the program metadata 183. Consequently, the OA material 184 is related (or linked) with the program organization 281 by the OA transmission information ID.

In step S151, the OA material registration block 651 records the program metadata 183 with the OA transmission information ID of the OA material 184 stored (or registered) to the recording apparatus 593 of the news report department 571.

In step S152, the program broadcasting block 652 of the broadcasting apparatus 602 broadcasts the news report program. To be more specific, the program broadcasting block 652 builds an OTC system and, when the broadcasting date and time of the news report program come, broadcasts the news report program in accordance with the program metadata 183.

In step S153, the archive list creation block 653 of the OA server management terminal 600 creates data of the archive list 185 for the news report program broadcast by the program broadcasting block 652, on the basis of the information recorded to the recording apparatus 593 and the OA material 184 recorded to the OA server 601. The archive list 185 includes OA transmission material ID, OA transmission information ID, news gathering ID, and material information ID. By the elements of the archive list 185, the OA material 184 is related with the news gathering materials 182-1 and 182-2. To be more specific, by the OA transmission material ID and the OA transmission information ID, the OA material 184 is related with the program metadata 183. By the news gathering ID, the program metadata 183 related with the OA material 184 is related with the news gathering item 191 and the news gathering location meta information 192. Further, the news gathering location meta information 192 including the news gathering ID described above includes the material information ID1 and material information ID2 for identifying the news gathering materials 182-1 and 182-2. Consequently, by the elements of the archive list 185, the OA material 184 is related with the news gathering materials 182-1 and 182-2.

In step S154, the archive list creation block 653 transfers the data of the archive list 185 to the archive management terminal 603 of the archive department 575.

Thus, the news report/transmission processing has been completed.

In step S201 shown in FIG. 26, the OA material transfer block 661 and the news gathering material transfer block 662 in the archive department 575 receive the archive list 185 coming from the archive list creation block 653 of the OA server management terminal 600 of the transmission department 574.

In step S202, the OA material transfer block 661 transfers the OA material 184 from the OA server 601 to the archive apparatus 604 in accordance with the archive list 185.

In step S203, the news gathering material transfer block 662 transfers the news gathering materials 182-1 and 182-2 from the material server 599 to the archive apparatus 604 in accordance with the archive list 185.

In step S204, the archive execution block 663 of the archive apparatus 604 executes archive processing. To be more specific, the archive execution block 663 relates the OA material 184 with the news gathering materials 182-1 and 182-2 and stores the related materials into a hard disk drive for example in the archive apparatus 604. As a result, the search block 664 of the archive management terminal 603 can easily execute search processing from one to the other of the OA material 184 and the news gathering materials 182-1 and 182-2.

In step S205, the restore block 665 restores the OA material 184 to the material server 599 of the editing department 573. Consequently, the editing department 573 can re-edit the news gathering materials 182-1 and 182-2.

Thus, the archive processing has been completed.

As described above, in the news report support system 561, if the imaging apparatus 596 cannot be connected to the external network 611, the news gathering material before editing can be related with the OA material obtained by editing. To be more specific, By OA transmission material ID, OA transmission information ID, news gathering ID, and material information ID1 and material information ID2, the OA material 184 is related with the news gathering materials 182-1 and 182-2 in a sequence of the OA material 184, the program metadata 183, the news gathering metadata 181, and the news gathering materials 182-1 and 182-2. Consequently, searching from one to the other of the OA material 184 and the news gathering materials 182-1 and 182-2 can be easily executed.

The embodiments of the present disclosure are applicable to any information processing apparatuses having an OTC system.

Application to Program of Present Disclosure

The above-mentioned sequence of processing operations may be executed by software as well as hardware.

When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

Recording media including the above-mentioned program are constituted by not only a package media made up of the magnetic disk (including flexible disks), the optical disk (including CD-ROM (Compact Disk Read Only Memory) and DVD (Digital Versatile Disk)), the magneto-optical disk (including MD (Mini Disk) (trademark)), or the semiconductor memory which is distributed separately from the apparatus itself such as removable media 811 in FIG. 27, but also the ROM in which the program is stored, a ROM 802 shown in FIG. 27 for example or a hard disk drive for example included in a storage block 808 shown in FIG. 27 which are provided for the user as pre-installed in the main apparatus.

It should be noted herein that the steps for describing each program recorded in recording media include not only the processing operations which are sequentially executed in a time-dependent manner but also the processing operations which are executed concurrently or discretely.

It should also be noted that term "system" as used herein denotes an entire apparatus configured by a plurality of component units.

The present disclosure contains subject matter related to that disclosed in Japanese Priority Patent Application JP 2010-138604 filed in the Japan Patent Office on Jun. 17, 2010, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. An information processing apparatus, comprising:
a creating block, including a hardware processor, configured to create relating information for relating each of one or more news gathering materials that are data obtained as a result of news gathering in accordance with predetermined news gathering contents with an On Air (OA) material obtained as a result of editing said one or more news gathering materials, the OA material including edited video and audio data obtained by editing video and audio data included in said one or more news gathering materials,
wherein said creating block, on the basis of:
news gathering metadata that is link information for relating said news gathering contents with said each of one or more news gathering materials by including a news gathering Identifier (ID) for identifying said news gathering contents and a material information ID for identifying each of said one or more news gathering materials;
program metadata for broadcasting said OA material related with said news gathering contents, said program metadata including said news gathering ID and an OA transmission information ID uniquely attached to said OA material that is a subject of broadcasting; and
OA transmission material information associated with said OA material that is a subject to be broadcast in accordance with said program metadata, said OA transmission material information including said OA transmission information ID and an OA transmission material ID for uniquely identifying said OA material itself,
creates information including said OA transmission material ID, said OA transmission information ID, said news gathering ID, and said material information ID as said relating information,
wherein said OA material is related to said one or more news gathering materials by relating said OA material to said program metadata by said OA transmission information ID, said program metadata being related to said news gathering metadata by said new gathering ID, and said news gathering metadata being related to each of said one or more news gathering materials by said material information ID.

2. The information processing apparatus according to claim 1, wherein
said news gathering metadata is recorded to a first apparatus separate from a cording media to which said news gathering material was recorded at news gathering;
said program metadata is recorded to said first apparatus;
said OA transmission material information is recorded to a second apparatus to which said OA material is recorded; and
said creating block
references said program metadata and said news gathering metadata by communication with said first apparatus, and
creates said relating information by referencing said OA transmission material information by communication with said second apparatus.

3. The information processing apparatus according to claim 1, wherein
said program metadata is recorded to a first apparatus;

said news gathering metadata is recorded to a recording media to which said news gathering material was recorded at news gathering and is recorded to said first apparatus via said recording media;

said OA transmission material information is recorded to a second apparatus to which said OA material is recorded; and said creating block references said program metadata and said news gathering metadata by communication with said first apparatus, and creates said relating information by referencing said OA transmission material information by communication with said second apparatus.

4. An information processing method, executed by a hardware processor, comprising:

creating relating information for relating each of one or more news gathering materials that are data obtained as a result of news gathering in accordance with predetermined news gathering contents with an On Air (OA) material obtained as a result of editing said one or more news gathering materials, the OA material including edited video and audio data obtained by editing video and audio data included in said one or more news gathering materials, wherein said creating step, on the basis of news gathering metadata that is link information for relating said news gathering contents with said each of one or more news gathering materials by including a news gathering Identifier (ID) for identifying said news gathering contents and a material information ID for identifying each of said one or more news gathering materials;

program metadata for broadcasting said OA material related with said news gathering contents, said program metadata including said news gathering ID and an OA transmission information ID uniquely attached to said OA material that is a subject of broadcasting; and OA transmission material information associated with said OA material that is a subject to be broadcast in accordance with said program metadata, said OA transmission material information including said OA transmission information ID and an OA transmission material ID for uniquely identifying said OA material itself, creates information including said OA transmission material ID, said OA transmission information ID, said news gathering ID, and said material information ID as said relating information, wherein said OA material is related to said one or more news gathering materials by relating said OA material to said program metadata by said OA transmission information ID, said program metadata being related to said news gathering metadata by said new gathering ID, and said news gathering metadata being related to each of said one or more news gathering materials by said material information ID.

5. A non-transitory computer-readable recording medium storing a program that when executed on a computer causes the computer to execute information processing, the program comprising a step of:

creating relating information for relating each of one or more news gathering materials that are data obtained as a result of news gathering in accordance with predetermined news gathering contents with an On Air (OA) material obtained as a result of editing said one or more news gathering materials, the OA material including edited video and audio data obtained by editing video and audio data included in said one or more news gathering materials, wherein said creating processing, on the basis of news gathering metadata that is link information for relating said news gathering contents with said each of one or more news gathering materials by including a news gathering Identifier (ID) for identifying said news gathering contents and a material information ID for identifying each of said one or more news gathering materials;

program metadata for broadcasting said OA material related with said news gathering contents, said program metadata including said news gathering ID and an OA transmission information ID uniquely attached to said OA material that is a subject of broadcasting; and OA transmission material information associated with said OA material that is a subject to be broadcast in accordance with said program metadata, said OA transmission material information including said OA transmission information ID and an OA transmission material ID for uniquely identifying said OA material itself, creates information including said OA transmission material ID, said OA transmission information ID, said news gathering ID, and said material information ID as said relating information, wherein said OA material is related to said one or more news gathering materials by relating said OA material to said program metadata by said OA transmission information ID, said program metadata being related to said news gathering metadata by said new gathering ID, and said news gathering metadata being related to each of said one or more news gathering materials by said material information ID.

6. An information processing system, comprising:

a news report department apparatus, including a hardware processor, creates news gathering metadata including a news gathering Identifier (ID) for identifying news gathering contents and transmits the created news gathering metadata to a news gathering department apparatus, wherein said news gathering department apparatus receives said news gathering metadata and records at least one piece of data obtained as a result of news gathering executed in accordance with said news gathering contents to a recording media as a news gathering material, said news gathering department apparatus further includes a material information ID for identifying each of said at least one news gathering material into said news gathering metadata in addition to said news gathering ID and transmits said news gathering metadata to said news report department apparatus as news gathering metadata as link information for relating said news gathering contents with said at least one news gathering material, and said news report department apparatus receives said news gathering metadata as said link information and records the received news gathering metadata; and an editing department apparatus, including a hardware processor, edits said at least one news gathering material obtained from said recording media and transmits data obtained as a result of the editing to a transmission department apparatus as an On Air (OA) material, the OA material including edited video and audio data obtained by editing video and audio data included in said at least one or more news gathering material, wherein said transmission department apparatus records said OA material and OA transmission material information including an OA transmission information ID uniquely attached to said OA material as a subject of broadcasting and an OA transmission material ID for uniquely identifying said OA material itself;

said news report department apparatus creates program metadata including said news gathering ID, said program metadata being for broadcasting said OA material corresponding to said news gathering contents;

said transmission department apparatus includes said OA transmission information ID into said program metadata and transmits said program metadata included with said OA transmission information ID to said news report department apparatus;

said news report department apparatus records said program metadata included with said OA transmission information ID; and after broadcasting said OA material in accordance with said program metadata included with said OA transmission information ID, said transmission department apparatus creates information including said OA transmission material ID, said OA transmission information ID, said news gathering ID, and said material information ID on the basis of said news gathering metadata, said program metadata, and said OA transmission material information as said link information obtained from said news report department apparatus as relating information for relating each of said at least one news gathering material with said OA material, wherein said OA material is related to said one or more news gathering materials by relating said OA material to said program metadata by said OA transmission information ID, said program metadata being related to said news gathering metadata by said new gathering ID, and said news gathering metadata being related to each of said one or more news gathering materials by said material information ID.

7. An information processing system, comprising:

a news report department apparatus, including a hardware processor, creates news gathering metadata including a news gathering Identifier (ID) for identifying news gathering contents and transmits the created news gathering metadata to a news gathering department apparatus, wherein said news gathering department apparatus receives said news gathering metadata and records at least one piece of data obtained as a result of news gathering executed in accordance with said news gathering contents to a recording media as a news gathering material, and said news gathering department apparatus further includes a material information ID for identifying each of said at least one news gathering material into said news gathering metadata in addition to said news gathering ID and records said news gathering metadata included with said material information ID to said recording media to which said at least one news gathering material is recorded as news gathering metadata as link information for relating said news gathering contents with said at least one news gathering material; and an editing department apparatus, including a hardware processor, edits said at least one news gathering material obtained from said recording media and transmits data obtained as a result of the editing to a transmission department apparatus as an On Air (OA) material the OA material including edited video and audio data obtained by editing video and audio data included in said at least one or more news gathering material, wherein said transmission department apparatus records said OA material and OA transmission material information including an OA transmission information ID uniquely attached to said OA material as a subject of broadcasting and an OA transmission material ID for uniquely identifying said OA material itself, upon demand from said transmission department apparatus, said editing department apparatus transmits said news gathering metadata to said transmission department apparatus as said link information obtained from said recording media, said news report department apparatus records said news gathering metadata as said link information received by said transmission department apparatus, said news report department apparatus creates program metadata including said news gathering ID and transmits said program metadata to said transmission department apparatus, said program metadata being for broadcasting said OA material corresponding to said news gathering contents, said transmission department apparatus includes said OA transmission information ID into said program metadata and transmits said program metadata included with said OA transmission information ID to said news report department apparatus, said news report department apparatus records said program metadata included with said OA transmission information ID; and after broadcasting said OA material in accordance with said program metadata included with said OA transmission information ID, said transmission department apparatus creates information including said OA transmission material ID, said OA transmission information ID, said news gathering ID, and said material information ID on the basis of said news gathering metadata, said program metadata, and said OA transmission material information as said link information obtained from said news report department apparatus as relating information for relating each of said at least one news gathering material with said OA material, wherein said OA material is related to said one or more news gathering materials by relating said OA material to said program metadata by said OA transmission information ID, said program metadata being related to said news gathering metadata by said new gathering ID, and said news gathering metadata being related to each of said one or more news gathering materials by said material information ID.

* * * * *